United States Patent
Nishiyama et al.

(10) Patent No.: US 7,221,796 B2
(45) Date of Patent: May 22, 2007

(54) CHARACTER INPUT DEVICE, CHARACTER INPUT METHOD AND CHARACTER INPUT PROGRAM

(75) Inventors: Kyosuke Nishiyama, Tokyo (JP); Shuji Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 681 days.

(21) Appl. No.: 10/382,588

(22) Filed: Mar. 7, 2003

(65) Prior Publication Data

US 2003/0169924 A1    Sep. 11, 2003

(30) Foreign Application Priority Data

Mar. 8, 2002   (JP)   ............... 2002-064323

(51) Int. Cl.
G06K 9/18   (2006.01)
(52) U.S. Cl. ...................... 382/182; 382/284
(58) Field of Classification Search ............... 382/182
See application file for complete search history.

(56) References Cited

U.S. PATENT DOCUMENTS

| | | | |
|---|---|---|---|
| 4,537,484 A * | 8/1985 | Fowler et al. | 396/15 |
| 5,063,603 A * | 11/1991 | Burt | 382/115 |
| 5,909,521 A * | 6/1999 | Nakao et al. | 382/312 |
| 5,966,460 A * | 10/1999 | Porter et al. | 382/159 |
| 5,978,495 A * | 11/1999 | Thomopoulos et al. | 382/124 |
| 6,041,141 A * | 3/2000 | Yamamoto et al. | 382/231 |
| 6,124,864 A * | 9/2000 | Madden et al. | 345/473 |
| 6,947,596 B2 * | 9/2005 | Kashioka et al. | 382/186 |
| 2002/0003892 A1 * | 1/2002 | Iwanaga | 382/124 |

FOREIGN PATENT DOCUMENTS

| | | |
|---|---|---|
| JP | 3-63895 A | 3/1991 |
| JP | 5-182024 A | 7/1993 |
| JP | 8-79621 A | 3/1996 |
| JP | 8-123901 A | 5/1996 |
| JP | 8-161431 A | 6/1996 |
| JP | 10-91722 A | 4/1998 |
| JP | 11-66226 A | 3/1999 |
| JP | 11-196255 A | 7/1999 |
| JP | 11-232378 A | 8/1999 |
| JP | 2000-48123 A | 2/2000 |
| JP | 2000-207338 A | 7/2000 |
| JP | 2000-278514 A | 10/2000 |
| JP | 2002-24762 A | 1/2002 |

* cited by examiner

*Primary Examiner*—Joseph Mancuso
*Assistant Examiner*—Kathleen Yuan
(74) *Attorney, Agent, or Firm*—Sughrue Mion, PLLC

(57) ABSTRACT

A character input device for inputting a character by extracting and recognizing a character from an image of a document photographed by a photographing device includes the photographing device. The device stores a recognition result of the extracted and recognized character and reliability indicative of sureness of recognition. Character recognition results of images obtained by repeatedly photographing a whole or part of the document are compared in order to input the character based on a character recognition result whose reliability is highest. A character input method includes adding reliability indicative of sureness of recognition to a recognition result of the character, comparing character recognition results of images obtained by repeatedly photographing the whole or part of the document, and selecting a character recognition result whose reliability is highest. A computer-readable medium encoded with a character input program for inputting a character by extracting and recognizing a character is also disclosed.

25 Claims, 35 Drawing Sheets

FIG. 19

FORMER SYNTHETIC-RECOGNITION-DATA SR

| RECOGNITION RESULT CHARACTER | a | b | c | d | e | f | g | h | j |
|---|---|---|---|---|---|---|---|---|---|
| RECOGNITION RELIABILITY | 43 | 41 | 55 | 73 | 88 | 45 | 63 | 43 | 11 |

CHARACTER-RECOGNITION-DATA CR

| RECOGNITION RESULT CHARACTER | f | g | h | i | j | k | l | m | n |
|---|---|---|---|---|---|---|---|---|---|
| RECOGNITION RELIABILITY | 23 | 53 | 64 | 75 | 89 | 66 | 32 | 43 | 11 |

NEW SYNTHETIC-RECOGNITION-DATA SR

| RECOGNITION RESULT CHARACTER | a | b | c | d | e | f | g | h | i | j | k | l | m | n |
|---|---|---|---|---|---|---|---|---|---|---|---|---|---|---|
| RECOGNITION RELIABILITY | 43 | 41 | 55 | 73 | 88 | 45 | 63 | 64 | 75 | 89 | 66 | 32 | 43 | 11 |

FIG. 22

FORMER SYNTHETIC-RECOGNITION-DATA SR

| RECOGNITION RESULT CHARACTER | a | b | c | d | e | f | g | h | i | j | k | l | m | n |
|---|---|---|---|---|---|---|---|---|---|---|---|---|---|---|
| RECOGNITION RELIABILITY | 43 | 41 | 55 | 73 | 88 | 45 | 63 | 64 | 75 | 89 | 66 | 32 | 43 | 11 |

CHARACTER-RECOGNITION-DATA CR

| RECOGNITION RESULT CHARACTER | a | b | c | d | e |
|---|---|---|---|---|---|
| RECOGNITION RELIABILITY | 30 | 90 | 87 | 47 | 50 |

NEW SYNTHETIC-RECOGNITION-DATA SR

| RECOGNITION RESULT CHARACTER | a | b | c | d | e | f | g | h | i | j | k | l | m | n |
|---|---|---|---|---|---|---|---|---|---|---|---|---|---|---|
| RECOGNITION RELIABILITY | 43 | 90 | 87 | 73 | 88 | 81 | 78 | 84 | 86 | 48 | 80 | 94 | 75 | 115 |

| ORDER | 1 | 2 | 3 | 4 | 5 | 6 |
|---|---|---|---|---|---|---|
| RECOGNITION RESULT CHARACTER | 6 | o | b | p | 8 | L |
| RECOGNITION RELIABILITY | 41 | 38 | 34 | 22 | 18 | 7 |

CHARACTER INPUT DEVICE, CHARACTER INPUT METHOD AND CHARACTER INPUT PROGRAM

BACKGROUND OF THE INVENTION

1. Field of the Invention

The present invention relates to a character input device, a character input method and a character input program and, more particularly, to a character input device, a character input method and a character input program which enable accurate input of a large amount of character information by using a photographing device such as a camera.

2. Description of the Related Art

When a document photographed by such an apparatus as a digital camera is taken to a computer as data, because such kind of camera has its limitation of resolution, taking the entire document including the large amount of character information by photographing might result in disabling character recognition. Therefore, when a document including a large amount of character information needs to be taken by photographing with high resolution, it is a conventional methods not to photograph the entire document for once but to macro-photograph the document divided into several regions several times. And those photographed images are taken into a computer and synthesized.

Some conventional character input methods are, for example, disclosed in Japanese Patent Laying-Open (Kokai) No. 2000-278514 and Japanese Patent Laying-Open (Kokai) No. Heisei 10-91722. In these character input methods, characters are recognized from an image photographed not by a camera but a handy scanner or the like and after they are positioned using the recognition results, images are synthesized to obtain the entire image. These methods enable high-quality images scanned by a handy scanner or the like to be effectively input. With an image photographed by a hand-held camera, however, a magnification varies with a distance to a paper or an image slants depending on how a camera is held, so that satisfactory results can not to be obtained in these conventional methods.

At the time of inputting a document into a computer, not an image but character information is most important. Proposed therefore is a technique of synthesizing not images but character recognition results to obtain character information of the entire document. Disclosed, for example, in Japanese Patent Laying-Open (Kokai) No. Heisei 11-196255 and Japanese Patent Laying-Open (Kokai) No. Heisei 11-232378 are techniques of obtaining high-quality camera photographed images by automatically moving a camera or correcting a photographed image, then recognizing characters to determine an overlap between character recognition results and synthesizing character information.

With the above-mentioned method, however, since divisional photographing is performed in a predetermined order to lastly perform character recognition and synthesis. Character recognition result will be confirmed after that. As a result, collating the entire recognition result with the original document takes much labor and time, and for storing photographed images and confirming the same on a screen, a storage capacity for storing all the images is required. In addition, when an error is found, it is necessary to select a character to be corrected and perform correction operations by some means for the purpose of correcting the error, which is a heavy burden on a user.

Downloading characters into a computer is expected to be performed by inputting and using a character string (URL or a mail address) as a part of a document in most of cases.

Among means for photographing a character string as a part of a document by a camera and inputting the same is the conventional technique disclosed in Japanese Patent Laying-Open (Kokai) No. 2000-207338. This technique realizes input of a part of character strings on a screen by subjecting only a region set by using a pointing device or the like to character recognition processing on an image photographed by a camera.

This technique fails to take into consideration input of such a long character string that can not be accommodated in one screen. Even if the character string is divisionally photographed a plurality of times and the divisional parts are then connected, it is troublesome to designate a region of the character string to be input at every photographing.

The technique neither takes a case where a character string to be input has a line feed halfway in a document into consideration. Therefore it is necessary, after divisional photographing, to link the images into one character string by using document editor software or the like.

Moreover, when unnecessary characters are printed adjacently before and after a character string to be input in a document, a photographing range should be strictly agreed with the character string to be input to prevent these unnecessary characters from being photographed, which is troublesome work.

The above-described conventional character input methods have the following shortcomings.

First problem is that in order to obtain an image neither with bias nor distortion, photographing manner should be better adapted or images having been photographed should be corrected by image processing by a user.

The reason is that images photographed by a camera, unlike those taken by using a dedicated device for taking in document images such as an optical scanner, have low resolution and distortion and are therefore inappropriate for character recognition. Another reason, as recited with respect to a second problem, is that since it is difficult to rectify erroneous recognition, images more suitable for recognition should be obtained.

Second problem is that confirmation and correction of an erroneous recognition are difficult.

The reason is that since character recognition is performed after divisional photographing of the entire document, confirmation of erroneous recognition takes enormous labor. And even if an error is found, troublesome work of designating the relevant character and selecting or inputting a correct character by some means is required.

Third problem is that in a case where a document is divisionally photographed, when an image which has no overlap portion with images photographed so far is photographed, it is impossible to correctly synthesize the image.

The reason is that when synthesizing results of divisional photographing, information about an overlap portion of each image is used.

Fourth problem is that when performing divisional photographing, holding a camera at the ready to press a shutter button over and over at every photographing is a heavy burden for a user.

The reason is that for divisionally photographing a document of a wide area, it is necessary to hold the camera at the ready each time to trip the shutter as many times as the number of divisions, which work takes much time and labor. In addition, operation of pressing the shutter button causes camera-shake.

Fifth problem is that it is not suitable for inputting a long character string as a part of a document.

The reason is that inputting such a long character string that can not be photographed for once is not taken into consideration. And even when photographing the document divisionally in a few times, a character string to be input in a photographed image should be designated in one manner or another at every photographing, which is troublesome.

Sixth reason is that it is difficult to input a character string having a line feed halfway.

The reason is that inputting a character string having a line feed is not taken into consideration and it is necessary to divisionally input parts of the string and link the same by using character editor software or the like.

Seventh problem is that when unnecessary character strings are printed adjacently before and after a character string to be input, input work is troublesome.

The reason is that a photographing range should be minutely adjusted by moving a camera or a processing range should be strictly designated such that unnecessary characters could not be input.

SUMMARY OF THE INVENTION

An object of the present invention is to provide a character input device, a character input method and a character input program which realize, when inputting characters by using a camera, input of the characters by accurate character recognition even when high-quality photographed images can not be obtained due to resolution of the camera, distortion of a lens or the like.

Another object of the present invention is to provide a character input device, a character input method and a character input program which realize character input without additional work of correcting photographed images by image processing in order to obtain images appropriate for recognition.

A further object of the present invention is to provide a character input device and a character input method which enable, when inputting characters by using a camera, correction of erroneous input caused by erroneous recognition of characters with ease.

A still further object of the present invention is to provide a character input device, a character input method and a character input program which enable, when inputting characters by using a camera, even if a range including no overlap portion is photographed by divisional photographing, use of the images without wasting the same.

A still further object of the present invention is to provide a character input device, a character input method and a character input program which eliminate the need of a series of operation of holding a camera at the ready over and over to press a shutter button every time a document is divisionally photographed.

A still further object of the present invention is to provide a character input device, a character input method and a character input program which enable, when inputting characters by using a camera, successive photographing of a long character string without designating a target each time.

A still further object of the present invention is to provide a character input device, a character input method and a character input program which enable, when inputting characters by using a camera, input of a character string printed having a line feed halfway with ease.

A still further object of the present invention is to provide a character input device, a character input method and a character input program which, when inputting characters by using a camera, eliminate the need of minutely adjusting a photographing range or strictly designating a processing range for the purpose of preventing photographing of unnecessary character strings printed adjacently before and after a necessary character string.

According to the first aspect of the invention, a character input device for inputting a character by extracting and recognizing a character from an image of a document photographed by a photographing device, wherein a recognition result of the character is stored with reliability indicative of sureness of recognition added, and character recognition results of images obtained by repeatedly photographing the whole or a part of the document are compared to input a character based on a character recognition result whose the reliability is the highest.

In the preferred construction, the reliability is determined based on at least information about a degree of coincidence between a dictionary to be referred in character recognition and a character extracted from the photographed image and about distortion of the photographed image.

According to the second aspect of the invention, a character input device for inputting a character by extracting and recognizing a character from an image of a document photographed by a photographing device, comprises character extraction means for extracting an image of a character portion from an image photographed by the photographing device, character recognition means for recognizing a character from the image of the character portion and making a character recognition result with the reliability added into character recognition data, recognition data synthesizing means for detecting and connecting overlap portions in the character recognition data obtained from a plurality of images of the same document, as well as selecting character recognition data whose the reliability is high with respect to the overlap portions to synthesize the plurality of the character recognition data into one the character recognition data, and recognition data storage means for storing the character recognition data synthesized.

In the preferred construction, the reliability is determined based on at least information about a degree of coincidence between a dictionary to be referred in character recognition and a character extracted from the photographed image and about distortion of the photographed image.

In another preferred construction, the recognition data synthesizing means detects, with respect to the character recognition data obtained from a plurality of images of the same document, an overlap portion between the character recognition data obtained from the latest image and the character recognition data obtained from a former image which is stored in the recognition data storage means and when the reliability of the character recognition data obtained from the latest image is higher, rewrites the character recognition data obtained from the former image in the recognition data storage means.

In another preferred construction, the character input device further comprises character correction means for reading, from the recognition data storage means, at least one other recognition candidate for a character designated from among characters stored as character recognition data and presenting the read candidate, and replacing character recognition data of the designated character with character recognition data of a character selected from among the recognition candidates to correct the character recognition data.

In another preferred construction, the character correction means selects, from among the character recognition data displayed on display means, character recognition data of a character located in the vicinity of the center of a photographed image as a character to be corrected.

In another preferred construction, the recognition data synthesizing means detects, with respect to the character recognition data obtained from a plurality of images of the same document, an overlap portion between the character recognition data obtained from the latest image and the character recognition data obtained from a former image which is stored in the recognition data storage means and when none of the overlap portion is detected, stores the character recognition data obtained from the latest image as pending data and detects an overlap portion of character recognition data obtained from a subsequently input image with the pending data.

In another preferred construction, the character input device further comprises means for detecting an amount of movement of the photographing device from a difference between successively input images and discriminating a stationary state of the photographing device based on the amount of movement to automatically give an image photographing instruction.

In another preferred construction, the character input device further comprises image temporary storage means for temporarily storing an image photographed by the photographing device, and image difference detecting means for detecting a difference between an image stored in the image temporary storage means and an image input from the photographing device and when the difference detected is not more than a predetermined threshold value, determining that the photographing device is at a stationary state to send a photographing instruction to the photographing device.

In another preferred construction, the image difference detecting means determines that the photographing device is at the stationary state when a state where the difference is not more than the predetermined threshold value continues for a predetermined period of time.

According to the third aspect of the invention, a character input method of inputting a character by extracting and recognizing a character from an image of a document photographed by a photographing device, comprises the steps of adding reliability indicative of sureness of recognition to a recognition result of the character, comparing character recognition results of images obtained by repeatedly photographing the whole or a part of the document, and selecting a character recognition result whose the reliability is the highest.

In the preferred construction, the reliability is determined based on at least information about a degree of coincidence between a dictionary to be referred in character recognition and a character extracted from the photographed image and about distortion of the photographed image.

In another preferred construction, the character input method further comprises the steps of detecting and connecting overlap portions in the character recognition data obtained from a plurality of images of the same document, and selecting character recognition data whose the reliability is high with respect to the overlap portions to synthesize the plurality of the character recognition data into one the character recognition data.

In another preferred construction, the character input method further comprises the step of, in the recognition data synthesis, with respect to the character recognition data obtained from a plurality of images of the same document, detecting an overlap portion between the character recognition data obtained from the latest image and the character recognition data obtained from a former image and when the reliability of the character recognition data obtained from the latest image is higher, rewriting the character recognition data obtained from the former image.

In another preferred construction, the character input method further comprises the step of designating a character stored as character recognition data to present other candidates for the designated character and replacing character recognition data of the designated character with character recognition data of a character selected from among the candidates to correct the character recognition data.

In another preferred construction, the character input method further comprises the step of moving a cursor to character recognition data of a character located in the vicinity of the center of a photographed image among the character recognition data displayed to indicate that it is highly probable that the character will be corrected.

In another preferred construction, the character input method further comprises the step of detecting, in the recognition data synthesis, with respect to the character recognition data obtained from a plurality of images of the same document, an overlap portion between the character recognition data obtained from the latest image and the character recognition data obtained from a former image and when detecting none of the overlap portion, storing the character recognition data obtained from the latest image as pending data and detecting an overlap portion of character recognition data obtained from a subsequently input image with the pending data.

In another preferred construction, the character input method further comprises the step of detecting an amount of movement of the photographing device from a difference between successively input images and discriminating a stationary state of the photographing device based on the amount of movement to automatically execute image photographing.

In another preferred construction, he character input method further comprises the steps of temporarily storing an image photographed by the photographing device, and detecting a difference between the temporarily stored image and an image input from the photographing device and when the difference detected is not more than a predetermined threshold value, determining that the photographing device is at a stationary state to send a photographing instruction to the photographing device.

In another preferred construction, the character input method further comprises the step of determining that the photographing device is at the stationary state when a state where the difference is not more than the predetermined threshold value continues for a predetermined period of time.

According to another aspect of the invention, a character input program executed on a computer for inputting a character by extracting and recognizing a character from an image of a document photographed by a photographing device, comprises the functions of adding reliability indicative of sureness of recognition to a recognition result of the character, and comparing character recognition results of images obtained by repeatedly photographing the whole or a part of the document to select a character recognition result whose the reliability is the highest.

In the preferred construction, the reliability is determined based on at least information about a degree of coincidence between a dictionary to be referred in character recognition and a character extracted from the photographed image and about distortion of the photographed image.

In another preferred construction, the character input program further comprises the functions of detecting and connecting overlap portions in the character recognition data obtained from a plurality of images of the same document, and selecting character recognition data whose the reliability is high with respect to the overlap portions to synthesize the plurality of the character recognition data into one the character recognition data.

In another preferred construction, the recognition data synthesis functions includes detecting, with respect to the character recognition data obtained from a plurality of images of the same document, an overlap portion between the character recognition data obtained from the latest image and the character recognition data obtained from a former image and when the reliability of the character recognition data obtained from the latest image is higher, rewriting the character recognition data obtained from the former image.

In another preferred construction, the character input program further comprises the function of the character correction function of designating a character stored as character recognition data to present other candidates for the designated character and replacing character recognition data of the designated character with character recognition data of a character selected from among the candidates to correct the character recognition data.

In another preferred construction, the character correction function includes moving a cursor to character recognition data of a character located in the vicinity of the center of a photographed image among the character recognition data displayed to indicate that it is highly probable that the character will be corrected.

In another preferred construction, the recognition data synthesis function includes detecting, with respect to the character recognition data obtained from a plurality of images of the same document, an overlap portion between the character recognition data obtained from the latest image and the character recognition data obtained from a former image and when detecting none of the overlap portion, storing the character recognition data obtained from the latest image as pending data and detecting an overlap portion of character recognition data obtained from a subsequently input image with the pending data.

In another preferred construction, the character input program further comprises the function of the function of detecting an amount of movement of the photographing device from a difference between successively input images and discriminating a stationary state of the photographing device based on the amount of movement to automatically execute image photographing.

In another preferred construction, the character input program further comprises the functions of temporarily storing an image photographed by the photographing device, and detecting a difference between the temporarily stored image and an image input from the photographing device and when the difference detected is not more than a predetermined threshold value, determining that the photographing device is at a stationary state to send a photographing instruction to the photographing device.

In another preferred construction, the character input device further comprises mark drawing means for drawing a mark indicative of a position of a specific character string designated in an image photographed by the photographing device, and line extraction means for dividing the photographed image into line images on a line basis and sequentially sending the divisional line images to the character extraction means starting with a line image closest to the mark.

In another preferred construction, the recognition data synthesizing means includes forced connection means for, when no overlap portion is detected between the character recognition data obtained from the latest image and the character recognition data obtained from a former image which is stored in the recognition data storage means, forcedly connecting the character recognition data according to an instruction from the user.

In another preferred construction, the character input device further comprises position control means for determining whether data is character recognition data from an initially photographed image based on character recognition data stored in the recognition data storage means and indicating the position of the beginning of a character string to be recognized when the character recognition data is of the initial photographed image and otherwise indicating the position of the end of the character string to be recognized, and deletion means for deleting a character of the character recognition data based on an indicated position at the beginning or the end of a character string to be recognized.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 19 is a diagram for use in explaining how recognition data is synthesized in the first concrete example of the present invention;

FIG. 22 is a diagram for use in explaining how recognition data is synthesized by re-photographing in the first concrete example of the present invention;

DETAILED DESCRIPTION OF EXEMPLARY EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
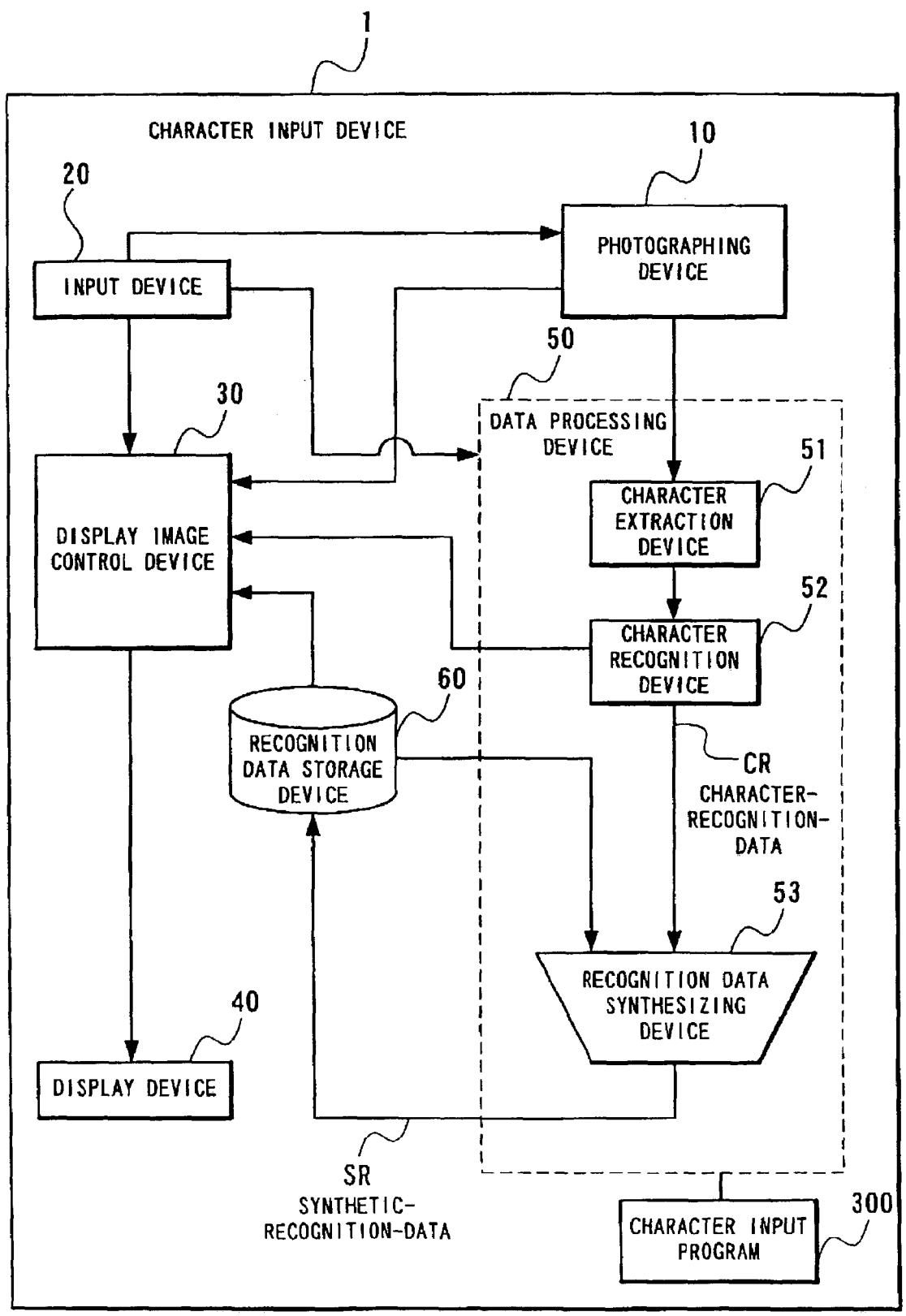
FIG. 1 is a block diagram showing a structure of a character input device according to a first embodiment of the present invention.

With reference to FIG. 1, a character input device 1 according to the first embodiment of the present invention comprises a photographing device 10 for receiving input of an image, a data processing device 50 for inputting characters from an photographed image, a recognition data storage device 60 for storing input data whose character is recognized, an input device 20 for allowing a user to operate the present device, a display device 40 for outputting processing process and result, and a display image control device 30 for controlling an image to be output to the display device 40.

The data processing device 50, which is realized by a program-controlled computer, includes a character extraction device 51, a character recognition device 52 and a recognition data synthesizing device 53.

The photographing device 10 is a photographing means realized by a CCD or the like. The photographing device 10 ordinarily outputs video picked up to the display image control device 30, and photographs a still picture when receiving input of a photographing instruction and sends an image of the picture to the character extraction device 51.

The input device 20 inputs an instruction from a user to the photographing device 10, the data processing device 50 and the display image control device 30.

The display image control device 30 is connected to the input device 20, the photographing device 10, the display device 40, the character recognition device 52, and the recognition data storage device 60. The display image control device 30 controls which of data sent from each device is to be displayed on the display device 40 according to an instruction inputted from the input device 20.

The display device 40 displays image data sent from the display image control device 30.

The character extraction device 51 of the data processing device 50, which is connected to the photographing device 10, performs image processing of an image photographed by the photographing device 10 to extract an image of each character and sends the same to the character recognition device 52.

The character recognition device 52 performs character recognition processing with respect to a character image generated by the character extraction device 51 and outputs character-recognition-data CR including a recognition result obtained from each character and such information as reliability which will be described later.

The recognition data synthesizing device 53 synthesizes data by detecting an overlap between two data, character-recognition-data CR inputted from the character recognition device 52 and synthetic-recognition-data SR inputted from the recognition data storage device 60 and outputs a synthesis result as synthetic-recognition-data SR to the recognition data storage device 60.

The recognition data storage device 60 stores synthetic-recognition-data SR sent from the recognition data synthesizing device 53.

Next, detailed description will be made of the entire operation of the character input device 1 according to the present embodiment with reference to FIG. 1 and the flow chart of FIG. 2.

First, when the present device starts operation, photographed video (previewing image) from the photographing device 10 is displayed on the display device 40 through the display image control device 30 (Step A1).

When a operation to photograph an picture is inputted to the photographing device 10 through the input device 20 by the pressing of a photographing button or the like (Step A2), a still picture is photographed by the photographing device 10 and an image thereof is sent to the display device 40 and the character extraction device 51 of the data processing device 50 (Step A3).

Upon receiving the image, the character extraction device 51 performs image processing to extract (cut out) an image of each character from the received image and sends the same to the character recognition device 52 (Step A4). Applicable as the character extraction processing is, for example, the technique recited in Japanese Patent Laying-Open (Kokai) No. Heisei 08-123901. When extraction of a character, image from the photographed image fails, again return to Step A1 (Step A5).

The character recognition device 52 is realized by using such conventional technique as recited in Japanese Patent Laying-Open (Kokai) No. Heisei 08-161431. The character recognition device 52 sequentially performs character recognition of an image of each character sent from the character extraction device 51 and outputs character-recognition-data CR including data of a predetermined number of candidates obtained as a recognition result and such information as recognition reliability (Step A6).

More specifically, character-recognition-data CR output as a character recognition result of a certain character includes data of a predetermined number of candidates and includes information about reliability indicative of sureness of character recognition. Candidate data may be one (first candidate) or be plural (second and the following candidates). In other words, when a plurality of candidates exist, character-recognition-data CR output as a character recognition result of a certain character includes not only data of the first candidate of the character but also data of a predetermined number of candidates starting with the second candidate. Also character-recognition-data CR includes information about reliability indicative of sureness of character recognition.

Reliability of recognition here represents a value indicative of sureness of character recognition obtained totally from such information about the degree of coincidence (obtained based on a distance between characteristic spaces of character images in character recognition) between a character template included in a dictionary to which the character recognition device 52 refers and a character image obtained by photographing and information about a position on an image and about distortion that a lens has. And it is assumed that the higher the reliability is, the higher sureness a character recognition result has.

As to information about a position on an image which is an element determining reliability of recognition, for example, since the more apart a character stays from the center of a photographed image, the more liable the image is to be distorted, when a distance from the center is short, the reliability is set to be high and as the distance from the center is increased, the reliability is decreased.

Also as an element which determines recognition reliability, information about a photographing time of a certain document in a series of character input operation may be taken into consideration. When a certain character is photographed a plurality of times, the reliability for recognition processing using a later photographed image is set to be higher.

Character-recognition-data CR obtained by the character recognition device 52 is sent to the recognition data synthesizing device 53.

The recognition data synthesizing device 53 discriminates and detects an overlap portion, assuming that synthetic-recognition-data SR input and stored in the recognition data storage device 60 and character-recognition-data CR newly inputted by the latest photographing are obtained, so that each includes an overlapping part of a certain long printed sentence (Step A8).

In the discrimination of an overlap portion by the recognition data synthesizing device 53, more precise result can be obtained when the discrimination is made based not only on a first candidate for a character but also on a plurality of candidates for the character included in the synthetic-recognition-data SR and the character-recognition-data CR (a predetermined number of candidates starting with the first candidate).

Here, if no synthetic-recognition-data SR exists in the recognition data storage device 60, the recognition data synthesizing device 53 sends new character-recognition-data CR as synthetic-recognition-data SR without modification to the recognition data storage device 60 (Step A7).

When there exists synthetic-recognition-data SR, but no overlap portion is detected, again return to Step A1 because no synthesis of character-recognition-data CR is possible (Step A9).

When an overlap portion is found, the recognition data synthesizing device 53 synthesizes the synthetic-recognition-data SR with the inputted character-recognition-data CR. At this time, the recognition data synthesizing device 53 determines each character at the overlap portion with reference to reliability of the character and adds character-recognition-data CR of a newly photographed portion (portion not included in the synthetic-recognition-data SR) out of the inputted character-recognition-data CR to the synthetic-recognition-data SR. As to the overlap portion (portion included in the synthetic-recognition-data SR), the recognition data synthesizing device 53 compares the synthetic-recognition-data SR and the character-recognition-data CR with respect to each character and replaces a character whose synthetic-recognition-data SR has lower recognition reliability by a character of the inputted character-recognition-data CR (Step A10, A11).

The synthetic-recognition-data SR synthesized with the character-recognition-data CR is again sent to the recognition data storage device 60 and stored and updated (Step A12).

The synthetic-recognition-data SR so far input is output to the display device 40 through the display image control device 30 (Step A13).

The processing of synthesizing the character-recognition-data CR at Steps A10 and A11 effectively works in both cases where a part of synthetic-recognition-data SR and a part of character-recognition-data CR overlap with each other and where the whole of the data overlap. It is therefore possible, not only in a case where images obtained by divisional photographing are connected but also in a case where a erroneous character is re-photographed or a case where a erroneous character photographed by close-up after once photographing the whole, to preferentially synthesize character-recognition-data CR whose reliability is high from both the data to increase recognition precision of the whole of an inputted sentence.

Next, description will be made of effects of the input device according to the present embodiment which is thus structured and operates.

In the present embodiment, at the time of character recognition, recognition reliability is set for each character and stored together with a result of the character recognition. Then, when reliability of a result obtained by recognizing a new photographed image is higher than that of the stored synthetic-recognition-data SR, update the synthetic-recognition-data SR with the recognition result having higher reliability.

Much of the deterioration of an image due to photographing by the photographing device 10 (for example, a camera) is local, such as distortion of an edge of a screen or shadow of a hand, and an image of a vicinity of the center of the screen is expected to have a little distortion and high recognition reliability.

Since successive photographing will leave an input result of a highly reliable part, no user needs to care about quality of an individual photographed image and partial distortion.

Even when an error occurs in recognition, further input of an image of the erroneous character photographed to have excellent image quality leads to proper replacement, so that user's labor for correction can be drastically reduced such as re-photographing of the entire image and later inputting of a correct character for the purpose of rectifying partial erroneous recognition.

Next, a first concrete example of the present invention will be described with reference to the drawings. The first example corresponds to the first embodiment of the present invention.

Figure 12:
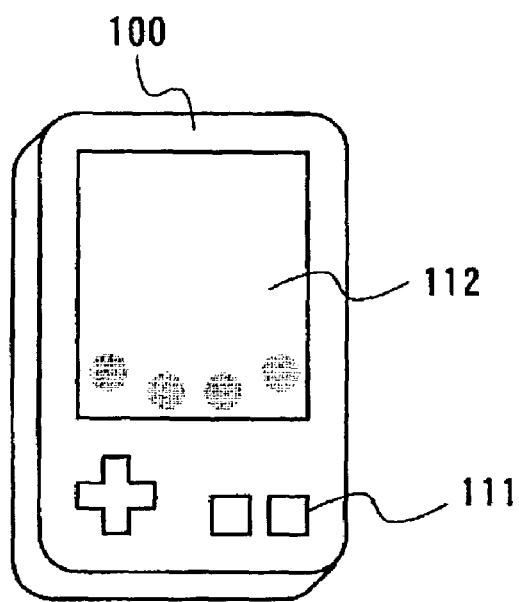
FIG. 12 is a perspective view of a portable terminal seen from its front according to a first concrete example of the present invention.
Figure 13:
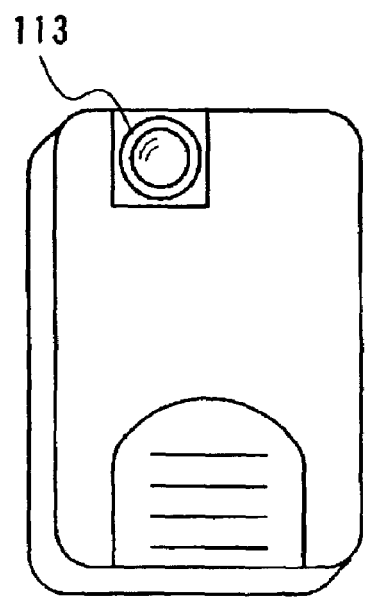
FIG. 13 is a perspective view of a portable terminal seen from its back according to the first concrete example of the present invention.

In the present example, a character input device is realized as a portable terminal 100 as illustrated in FIGS. 12 and 13. FIG. 12 is a perspective view of the portable terminal 100 seen from the front and FIG. 13 is a perspective view seen from the back.

The portable terminal 100 includes buttons 111 as the input device 20, a liquid crystal display 112 as the display device 40, and a camera 113 as the photographing device 10. The portable terminal 100 is internally provided with a central processing device which functions as the data processing device 50 and a storage device which functions as the recognition data storage device 60.

Figure 14:
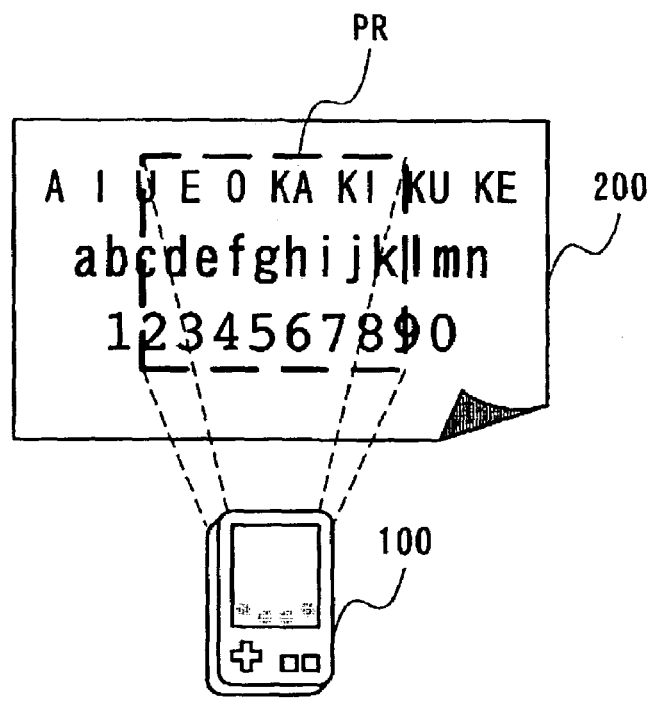
FIG. 14 is a diagram for use in explaining a relationship between a target to be photographed and a photographing range in the first concrete example of the present invention.

In the present example, consider a case where such a document 200 as shown in FIG. 14 is photographed and input by the portable terminal 100. Since resolution of the camera 113 is low here, photographing should be performed close to document 200 in order to photograph characters of the document 200 to have such resolution as enabling recognition of the characters, and a range which can be photographed for once (photographing range PR) has an area represented by a dotted rectangle in the figure. In other words, it is impossible to photograph the entire sentence for once and recognize the same.

Figure 15:
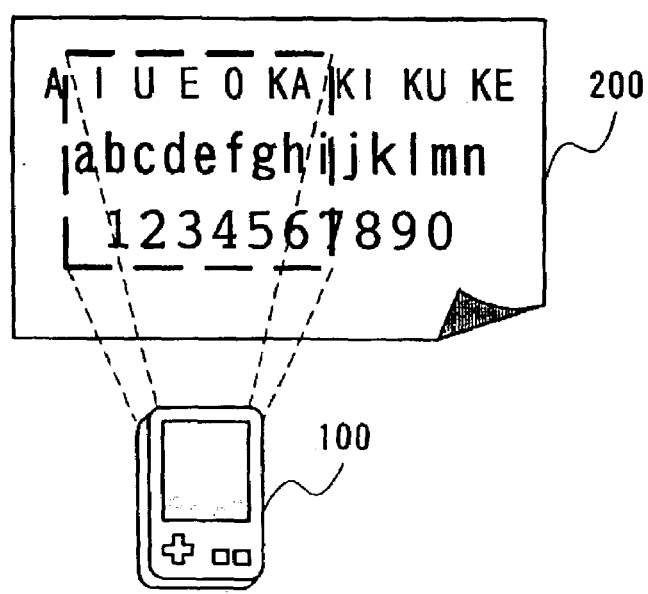
FIG. 15 is a diagram for use in explaining how the left side of a printed document is photographed in the first concrete example of the present invention.

Therefore, first the left half of the document 200 is photographed as illustrated in FIG. 15.

From data of a photographed image, a character image is extracted by the data processing device 50 provided in the portable terminal 100 and then character recognition is performed with respect to each character to output character-recognition-data CR with a character code and recognition reliability paired.

Figure 16:
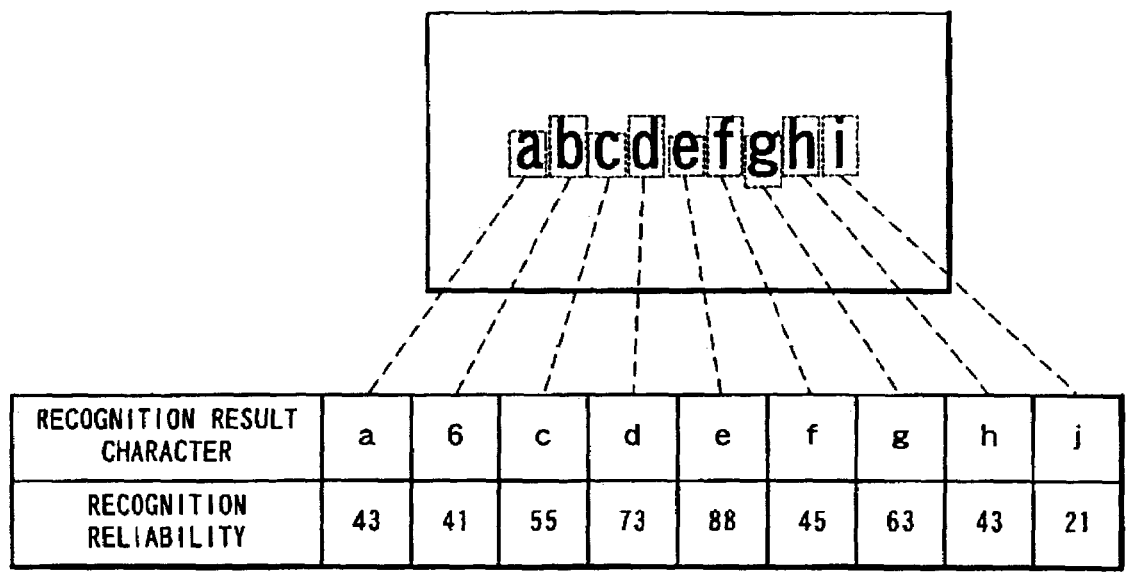
FIG. 16 is a diagram for use in explaining how characters on the left side of the second line of a sentence are recognized in the first concrete example of the present invention.

FIG. 16 shows a recognition result of a character string in the second line as an example. Each recognition result character in FIG. 16 represents a character indicated by a character code of a first recognition candidate for an extracted character image. Although for the purpose of simplification, illustration will be made only of a result of the second line, the same processing will be performed with respect to the other lines.

This is obtained by the first photographing and no synthetic-recognition-data SR is stored in the recognition data storage device 60. Therefore, the data processing device 50 stores the character-recognition-data CR obtained this time as synthetic-recognition-data SR without modification in the recognition data storage device 60 and a recognition result is displayed in the liquid crystal display 112.

At this time, it is preferable as a display method to output a screen on which a photographed image and a recognized character one-to-one correspond to each other, for example, because a user is allowed to confirm erroneous identification with ease.

Figure 17:
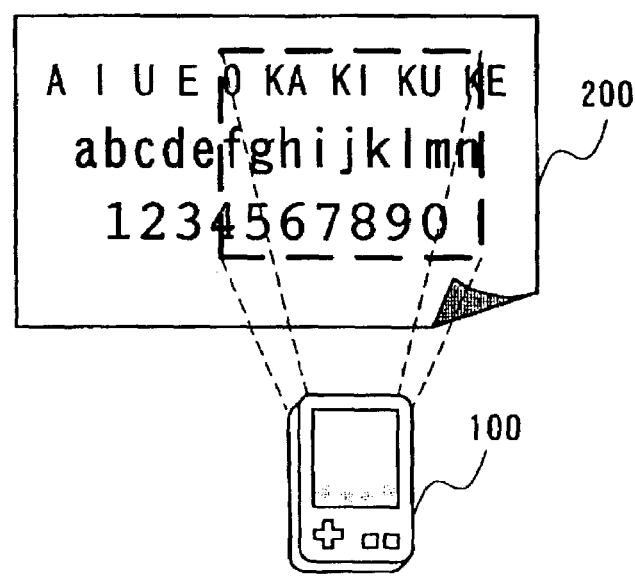
FIG. 17 is a diagram for use in explaining how the right side of the printed document is photographed in the first concrete example of the present invention.

Subsequently, the right half part of the document 200 is photographed as illustrated in FIG. 17. At this time, it is necessary to perform photographing so as to have an overlap portion with the sentence image photographed last time.

Figure 18:
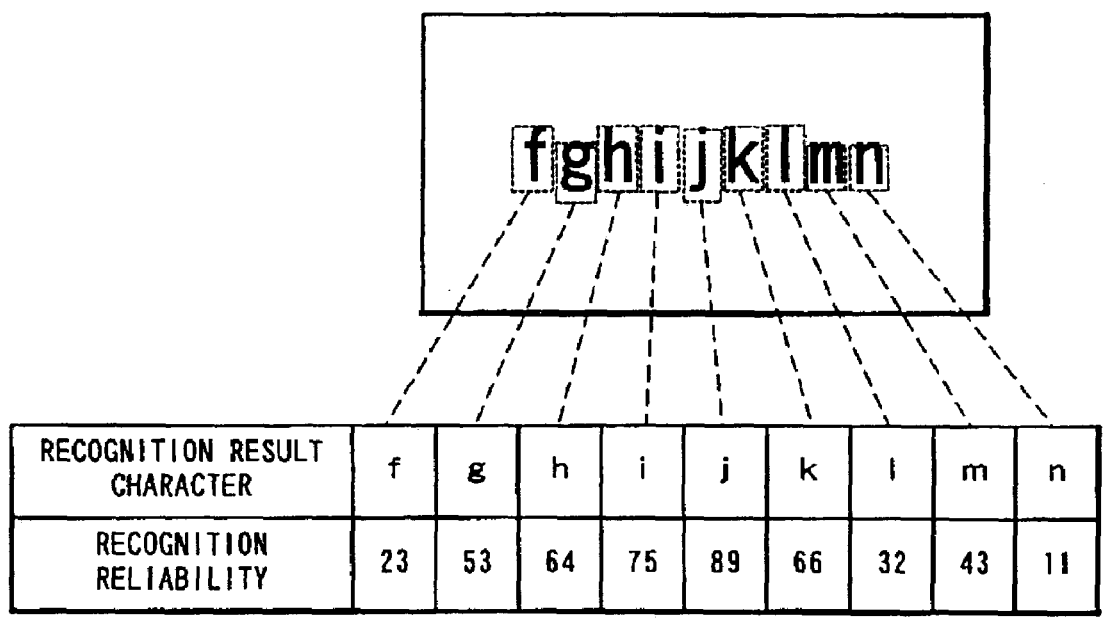
FIG. 18 is a diagram for use in explaining how characters on the right side of the second line of the sentence are recognized in the first concrete example of the present invention.

From data of the photographed image, a character is extracted by the character extraction device 51 in the data processing device 50 as illustrated in FIG. 18 and then converted into character-recognition-data CR through the character recognition device 52.

Here, the recognition data synthesizing device 53 of the data processing device 50 examines overlapping between the synthetic-recognition-data SR input last time and stored (characters "abcdefghj") and the character-recognition-data CR input this time (characters "fghijklmn") and searches for an overlap position having a portion in which the largest number of characters coincide with each other. An overlap between right four characters of the data inputted last time and left four characters of the data inputted this time has the largest number of coincident characters, three characters out of four, so that this portion is determined to be an overlap portion.

Then, as illustrated in FIG. 19, the synthetic-recognition-data SR (the character-recognition-data CR input and stored last time) is synthesized with the character-recognition-data CR (the character-recognition-data CR input this time).

First, as to the right two characters "hi" out of the overlapped four characters, those of the character-recognition-data CR whose recognition reliability is high are adopted. Similarly, as to the left two characters "fg", those of the synthetic-recognition-data SR whose recognition reliability is high are adopted. As a result, the character "j" erroneously recognized at the first time will be corrected to "i" by the second photographing.

Next, the part "jklmn" which is a part newly photographed by photographing this time is connected to the end of the synthetic-recognition-data SR.

Thus synthesized (corrected/connected) data is again stored in the recognition data storage device 60 and displayed on the liquid crystal display 112 as an input result.

Here, since the input result has an error, the user is allowed to try to correct the same by photographing the character one more time.

Figure 20:
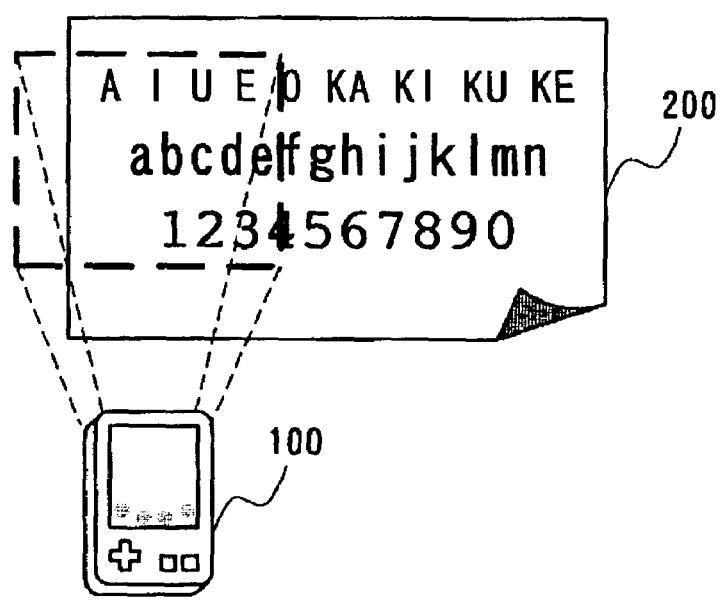
FIG. 20 is a diagram for use in explaining how correction is made by re-photographing in the first concrete example of the present invention.

FIG. 20 shows how re-photographing is performed to move the portable terminal 100 such that the character "b" comes to the center of the screen in order to rectify erroneous recognition of "b" as being "6". Since the closer to the center, the less distorted and the more focused a camera image is in general, photographing at the center of the screen will obtain an image appropriate for character recognition.

Figure 21:
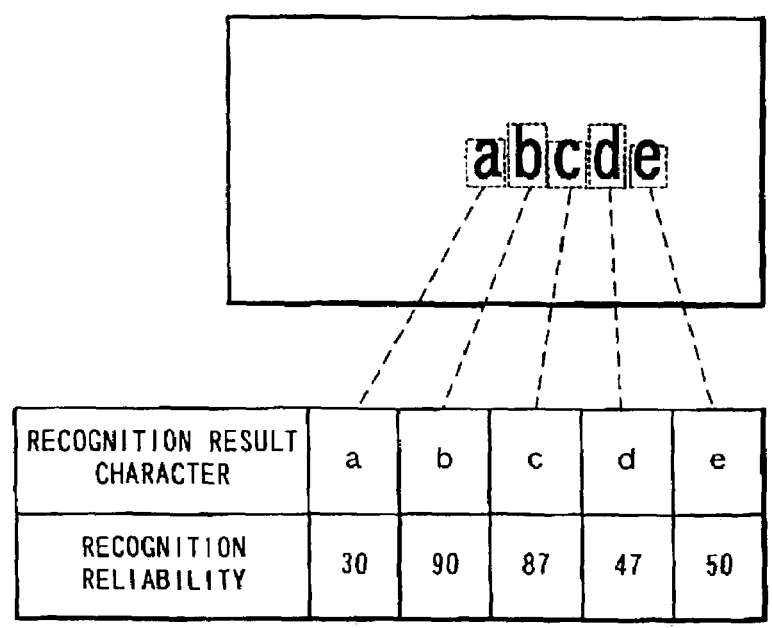
FIG. 21 is a diagram for use in explaining how characters in a range centered around "b" in the second line of the sentence are recognized in the first concrete example of the present invention.

From the photographed image, characters are extracted, recognized and converted into character-recognition-data CR shown in FIG. 21 and then synthesized with the synthetic-recognition-data SR.

Here, since the character-recognition-data CR obtained this time is all included in the synthetic-recognition-data SR, none of new characters is added to the synthetic-recognition-data SR to perform processing of an overlap portion.

As shown in FIG. 22, the synthetic-recognition-data SR is compared with the character-recognition-data CR and "bc" whose character recognition reliability is lower in the synthetic-recognition-data SR is replaced with those of the character-recognition-data CR.

Through the foregoing operation, by divisionally photographing the document 200 which can not be entirely photographed for once, its synthetic-recognition-data SR could be stored in the recognition data storage device 60. In addition, erroneous recognition could be rectified by re-photographing.

Although in this example, divisional photographing is performed two times, input is possible even of a sentence printed in a wider area by varying the number of times of divisional photographing according to the size of the area.

Moreover, since the photographing is performed with the sentence divided horizontally in this example, also with a vertically long sentence, it is possible to photograph the sentence vertically divided and synthesize the same.

Furthermore, since the present concrete example has been described with respect to a case where a large document is divisionally photographed by the camera 113 whose resolution is low, the input method realized in the present embodiment is not limited thereto.

Figure 23:
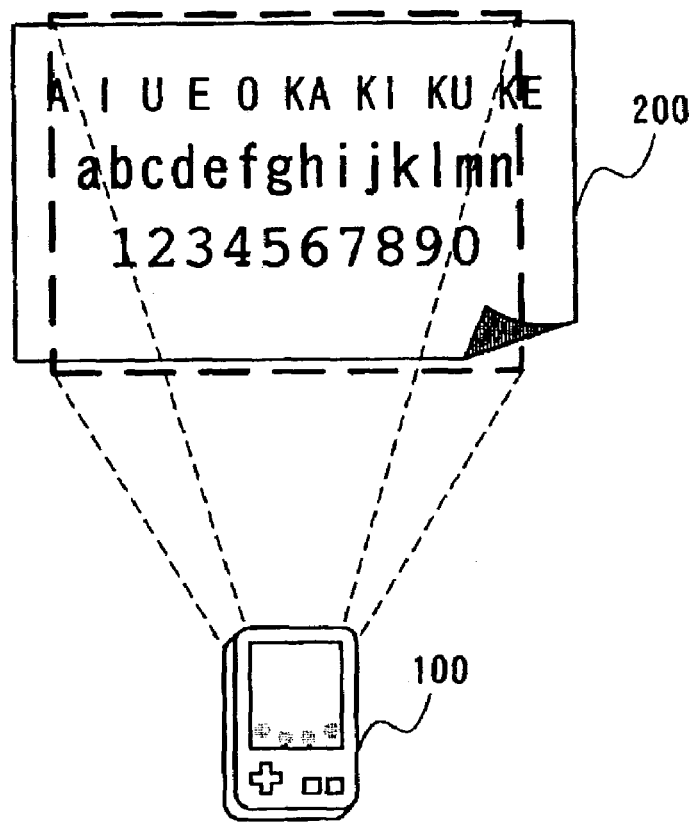
FIG. 23 is a diagram for use in explaining how photographing is performed using a camera with high resolution in the first concrete example of the present invention.

Assume, for example, that the camera 113 has high resolution and has a mechanism capable of automatically or manually changing a focal length, it is possible to first photograph the whole of the document 200 as shown in FIG. 23.

Figure 24:
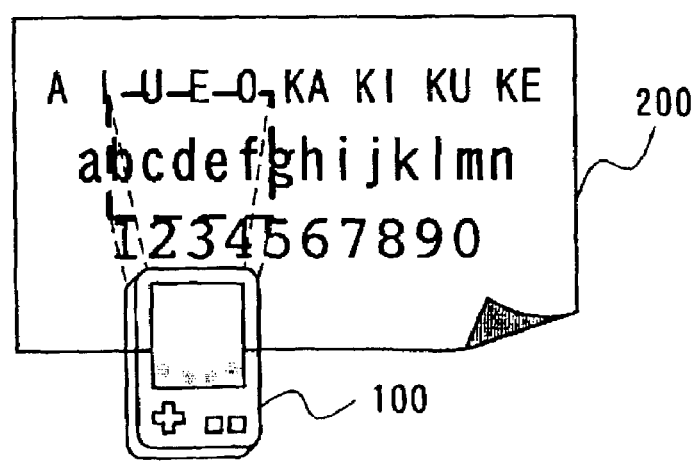
FIG. 24 is a diagram for use in explaining how correction is made by close-up in the first concrete example of the present invention.

When erroneous recognition occurs here, rectification can be tried by closely photographing the document such that an erroneously recognized character comes to the center as illustrated in FIG. 24. The character image photographed to have a large size by close-up has high resolution and high character recognition reliability as well, so that it is highly probable that the image will properly replace the erroneously recognized character.

Next, detailed description will be made of a character input device according to a second embodiment of the present invention with reference to the drawings.

Figure 3:
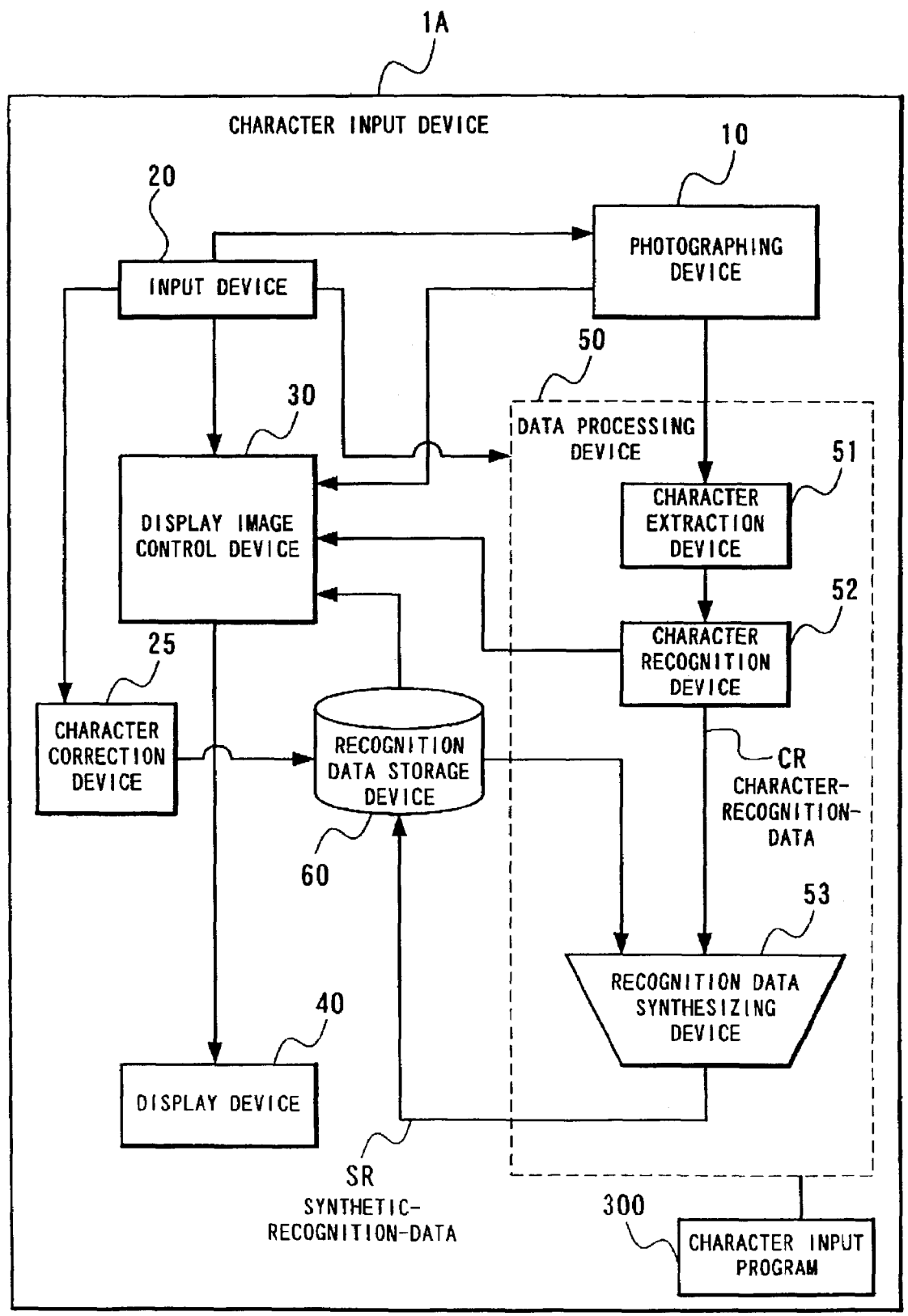
FIG. 3 is a block diagram showing a structure of a character input device according to a second embodiment of the present invention.

With reference to FIG. 3, a character input device 1A according to the second embodiment of the present invention differs from the first embodiment shown in FIG. 1 in that in addition to the components of the first embodiment, a character correction device 25 for correcting a character through the operation of the input device 20 is connected to the recognition data storage device 60. The character correction device 25 has a function of directly correcting synthetic-recognition-data SR stored in the recognition data storage device 60.

Figure 4:
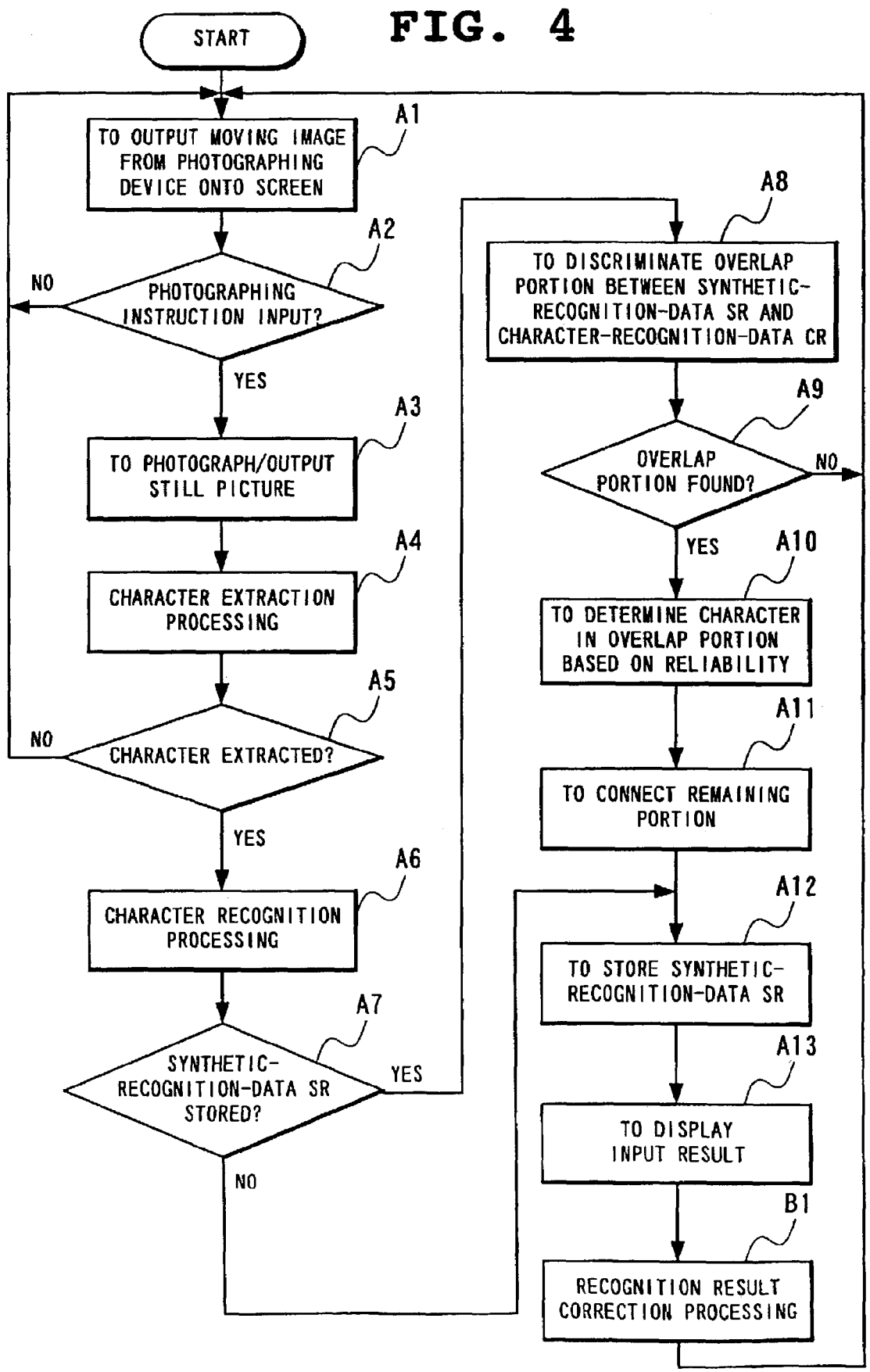
FIG. 4 is a flow chart for use in explaining operation of the second embodiment of the present invention.

Operation of the character input device 1A according to the present embodiment will be described with reference to the drawings. FIG. 4 is a flow chart showing operation of the character input device 1A according to the second embodiment.

Figure 2:
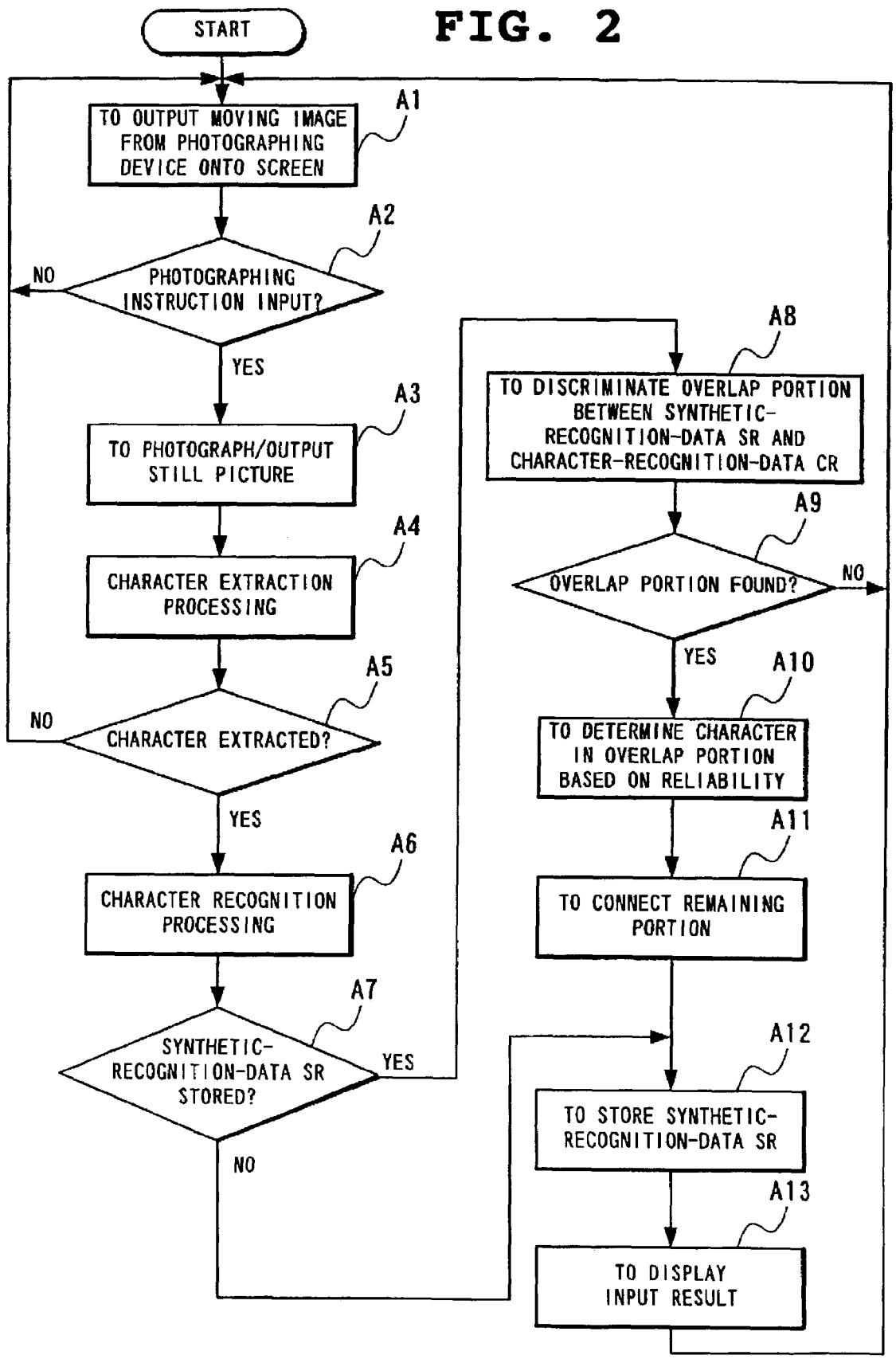
FIG. 2 is a flow chart for use in explaining operation of the first embodiment of the present invention.

Here, the operation of the present embodiment differs from that of the first embodiment of the present invention illustrated in FIG. 2 in that after Step A13, recognition result correction processing (Step B1) by the character correction device 25 is added for correcting a recognition result as shown in FIG. 4 (Step B1). Description of the common steps to those of FIG. 2 will be therefore omitted.

Figure 5:
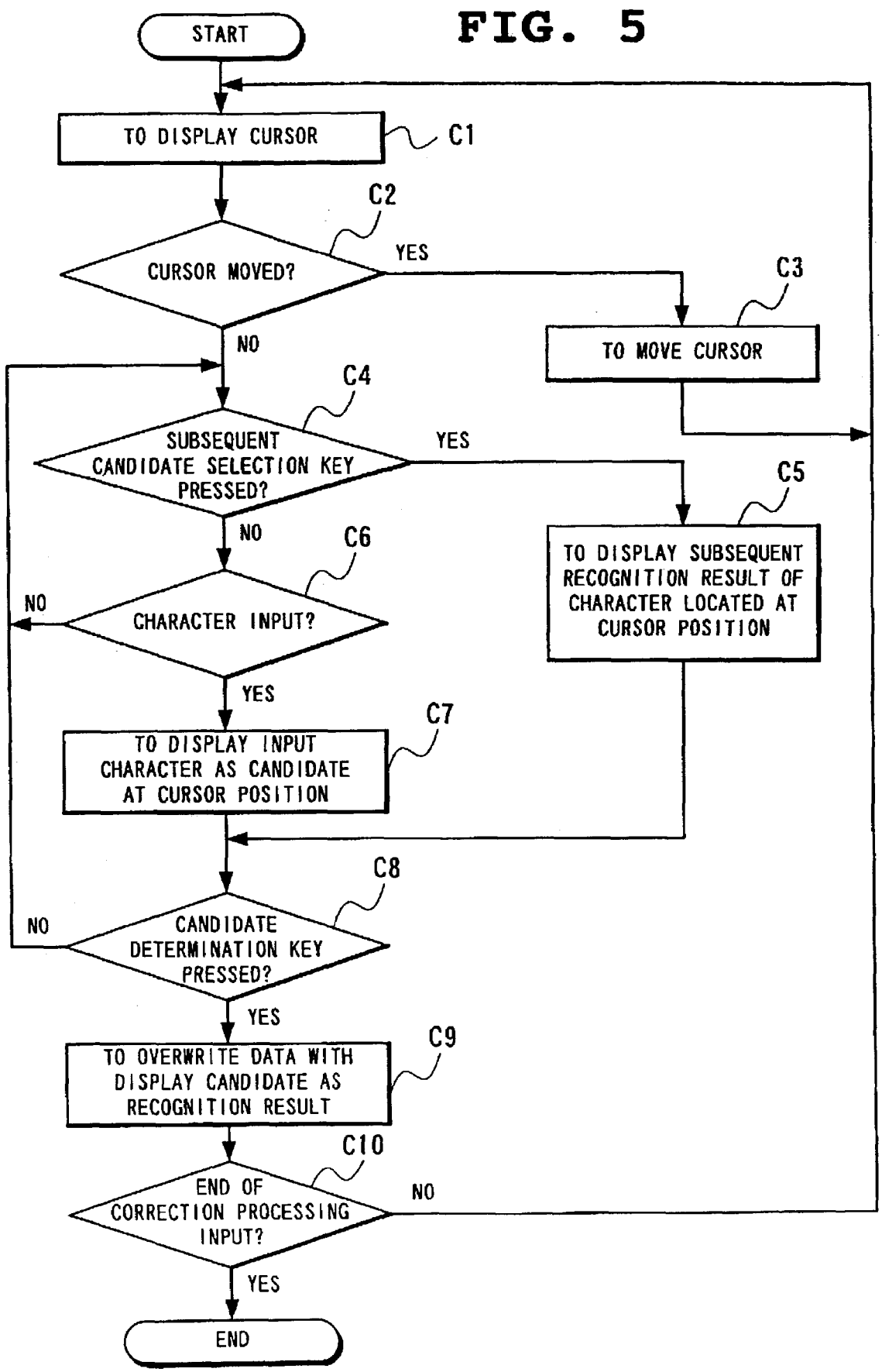
FIG. 5 is a flow chart for use in explaining operation of recognition result correction processing in the second embodiment of the present invention.

Detailed description will be made of operation of the recognition result correction processing (Step B1) by the character correction device 25 which is the feature of the present embodiment with reference to FIG. 5.

When the recognition result correction processing starts, a cursor for recognition result correction is displayed at a position of a recognition result corresponding to a character extracted at a position closest to the center of an image photographed last (Step C1). When a user re-photographs for the correction, because a character to be corrected is very likely to be located near the center of the re-photographed screen, displaying the cursor at a position of a character extracted near the center of the re-photographed screen eliminates or reduces user's operation of moving the cursor while searching for a character to be corrected.

Then, the cursor can be moved on a document of the displayed recognition result by using the input device 20 (Steps C2 and C3).

Moreover, when operation to display a subsequent candidate is executed through the input device 20, the synthetic-recognition-data SR stored in the recognition data storage device 60 is searched for a subsequent recognition candidate for the character designated by the cursor and the candidates are displayed (Steps C4 and C5). As described in the first embodiment, when a plurality of candidates exist, character-recognition-data CR (synthetic-recognition-data SR as well) output as a character recognition result of a certain character includes not only data of a first candidate for the character but also data of a predetermined number of candidates starting with the second candidate. These candidates will be searched for and displayed.

On the other hand, when a character is directly input through the input device 20, the input character is displayed as a candidate in place of the character designated by the cursor (Steps C6 and C7).

When operation to determine the candidate is executed through the input device 20, the corresponding synthetic-recognition-data SR in the recognition data storage device 60 is overwritten, and the recognition candidate is displayed as a right recognition candidate. When no candidate is determined, return to candidate selection (Step C8–Step C9).

Correction processing will be continued until operation to end the correction processing is executed through the input device 20 (Step C10).

These cursor movement, candidate selection and direct character input can be realized by a small-sized keyboard having cursors indicated by upward and downward and rightward and leftward arrows or realized by such a device as having a touch panel and a pen which can directly designate a character on the display device 40.

Next, effects of the second embodiment which is thus structured and operates will be described.

Since the present embodiment thus enables selection of a subsequent candidate for recognition of a designated character, and enables selection of a right recognition candidate to overwrite the corresponding synthetic-recognition-data SR with the same, even when erroneous character recognition could not be corrected by re-photographing, a correct character can be input with ease. In addition, since a cursor is automatically displayed at a position of a character re-photographed at the center of the screen with the user's intention to make correction, operation of manually moving the cursor in search for a character to be corrected is unnecessary, which makes correction operation easier.

Next, a second concrete example of the present invention will be described in detail with reference to the drawings. The present concrete example corresponds to the second embodiment.

The present example has the same structure as that of the first example and is realized by the portable terminal 100 shown in FIGS. 12 and 13, but differs in that the central processing device functions as the character correction device 25.

Now assume that in order to input the document 200 shown in FIG. 14 similarly to the first example, first the left half is photographed as illustrated in FIG. 15 and then the right half is photographed as illustrated in FIG. 17 to synthesize character-recognition-data CR and furthermore photograph such that the character "b" comes to the center as shown in FIG. 20 in order to correct erroneous recognition of the character "b" as being "6".

Unlike the case of the first concrete example, however, assume that the character "b" is erroneously recognized to be the character "6" also in the second photographing and no correction is made.

Figures 25, 26:
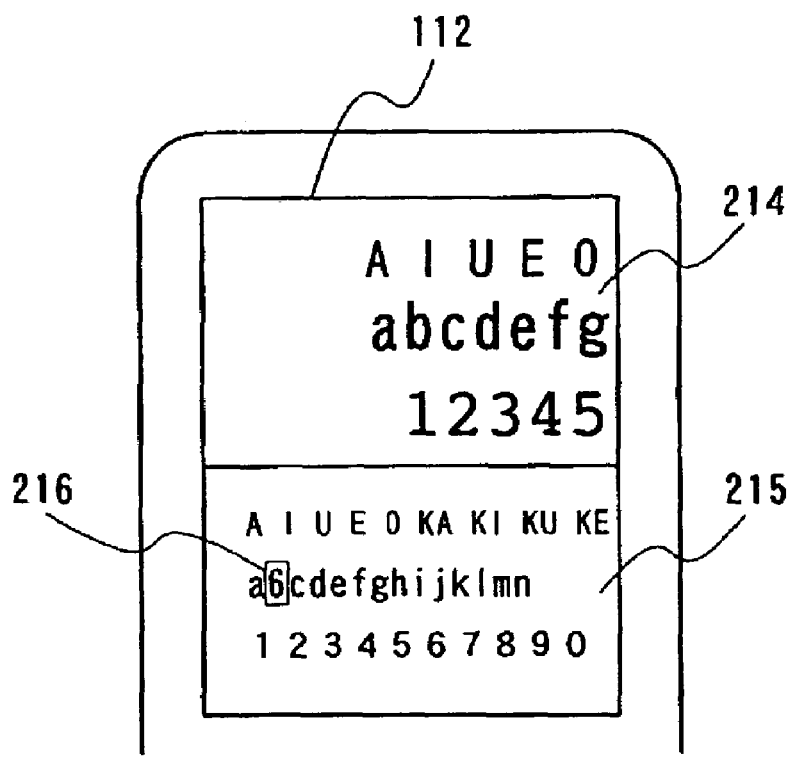
FIG. 25 is a diagram for use in explaining how input results are displayed in a second concrete example of the present invention.
FIG. 26 is a diagram for use in explaining how recognition data of the character "b" is in the second concrete example of the present invention.

Here, as shown in FIG. 25, both of a photographed image 214 and an input result 215 are displayed on the liquid crystal display 112. In addition, since the photographing is performed centered around the character "b", a square cursor 216 is located at the character "6" corresponding to the input result.

Here, the user is allowed to display a subsequent candidate for character recognition by pressing a subsequent candidate display button provided in the buttons 111. Assume that a character recognition candidate for "b" and reliability of the corresponding character recognition are stored in such a form as shown in FIG. 26.

Assuming that the first candidate is displayed, "b" is displayed on the screen as a third candidate by pressing the subsequent candidate button twice.

Here, when the user presses a determination button provided in the buttons 111, the character "b" is stored in the recognition data storage device 60 as a correct recognition result.

Next, detailed description will be made of a character input device according to a third embodiment of the present invention with reference to the drawings.

Figure 6:
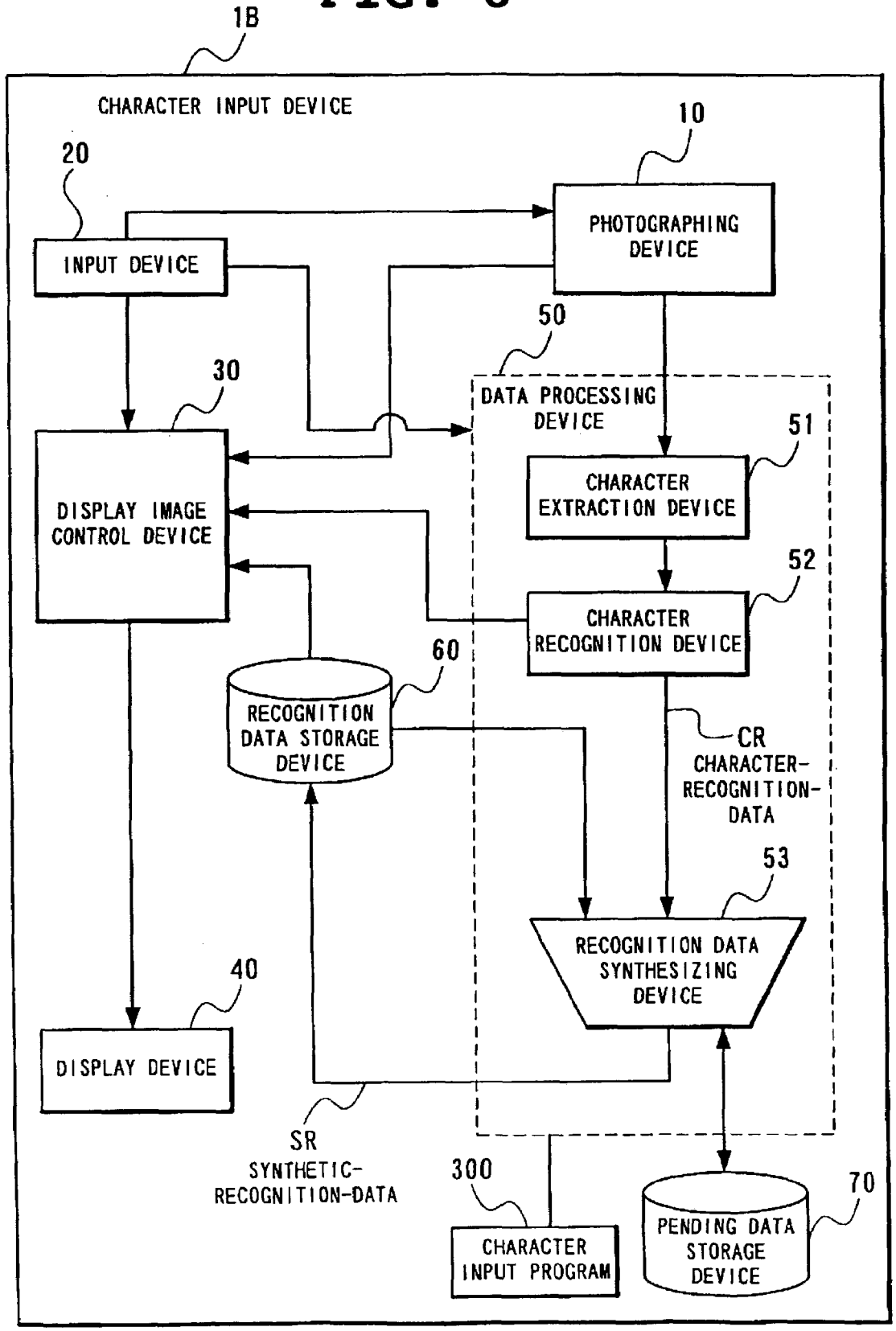
FIG. 6 is a block diagram showing a structure of a character input device according to a third embodiment of the present invention.

With reference to FIG. 6, a character input device 1B according to the third embodiment of the present invention differs from the structure according to the first embodiment shown in FIG. 1 in further including a pending data storage device 70.

The pending data storage device 70, which is connected to the recognition data synthesizing device 53, is for temporarily storing inputted character-recognition-data CR when no overlap between the character-recognition-data CR and synthetic-recognition-data SR is detected and no synthesis is made thereof. Then, when subsequent photographing is performed to synthesize new character-recognition-data CR with the synthetic-recognition-data SR, synthesis processing is again tried with the synthetic-recognition-data SR and character-recognition-data CR which is again returned from the pending data storage device 70 to the recognition data synthesizing device 53.

Next, operation of the character input device 1B according to the third embodiment will be detailed with reference to the drawings.

Figure 7:
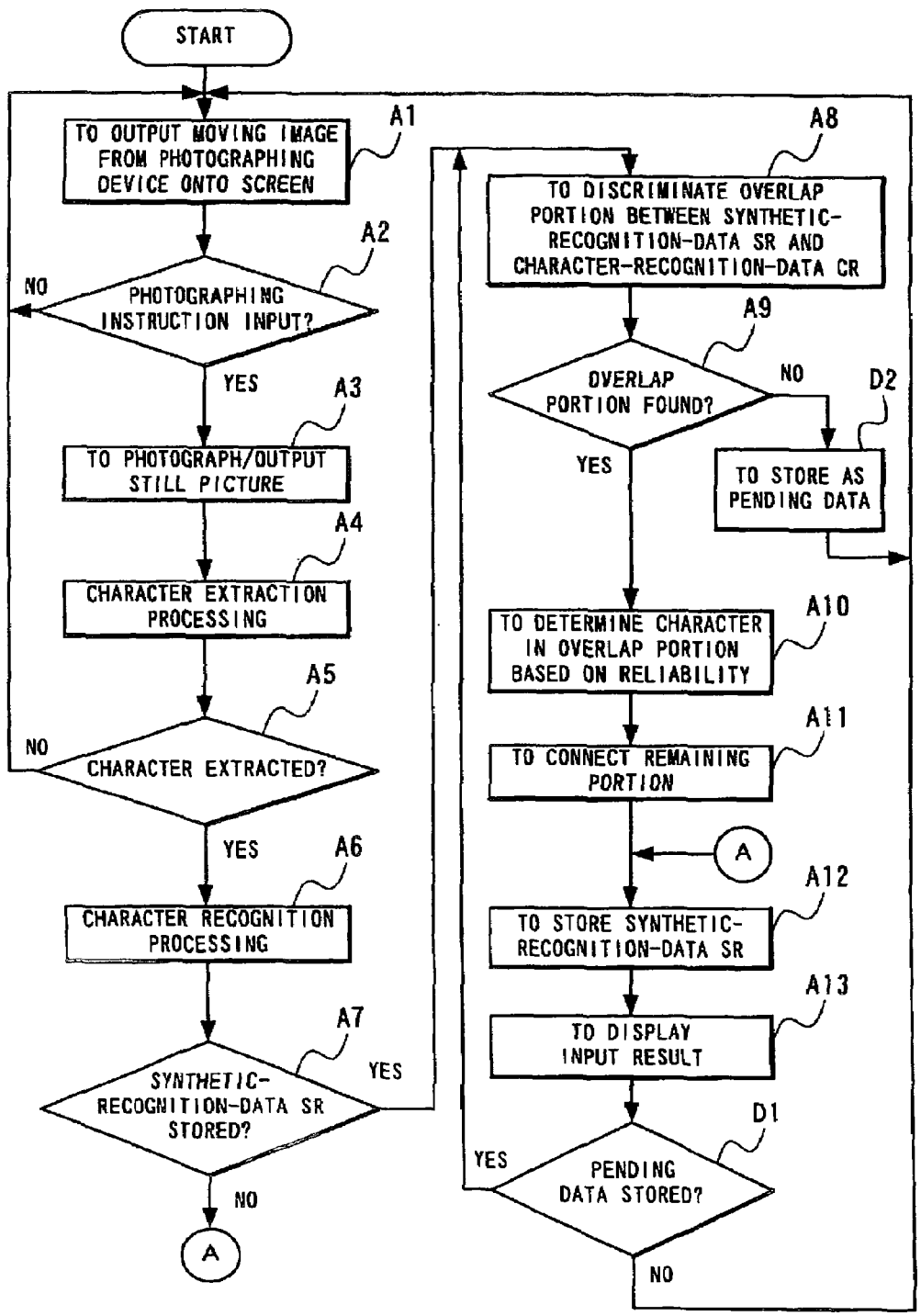
FIG. 7 is a flow chart for use in explaining operation of the third embodiment of the present invention.

With reference to FIG. 7, since Steps A1 to A8 and Steps A10 to A13 in the operation of the present embodiment are the same as those of the operation of the first embodiment shown in FIG. 2, no description thereof will be made.

At Step A9, as a result of search for an overlap between synthetic-recognition-data SR and character-recognition-data CR, if an overlap portion is found, proceed to Step A10 to perform synthesis. If no overlap is found, the characterrecognition-data CR is stored as pending data in the pending data storage device 70 to return to Step A1 (Step D2).

Thereafter, after synthesis of another character-recognition-data CR with the synthetic-recognition-data SR succeeds (Steps A10 to A13), if pending data is stored in the pending data storage device 70, synthesis processing is performed again by regarding the data as a new character string. When no pending data is stored, return to Step A1 (Step D1).

Next, effects of the third embodiment will be described.

With the pending data storage device 70, when no overlap is found to fail in input data synthesis, the input data is stored as pending data until the data is allowed to be synthesized by another photographing, the present embodiment enables, the data of so far recognized characters to be used for data synthesis without wasting the data, even when a user moves his or her hand too much at the time of divisional photographing to photograph an image including no overlap portion.

Next, a third concrete example of the present invention will be described with reference to the drawings. The present concrete example corresponds to the third embodiment of the present invention.

Similar to the first concrete example, the present concrete example is realized by the portable terminal 100, but differs in that the storage device functions also as the pending data storage device 70.

Figure 27:
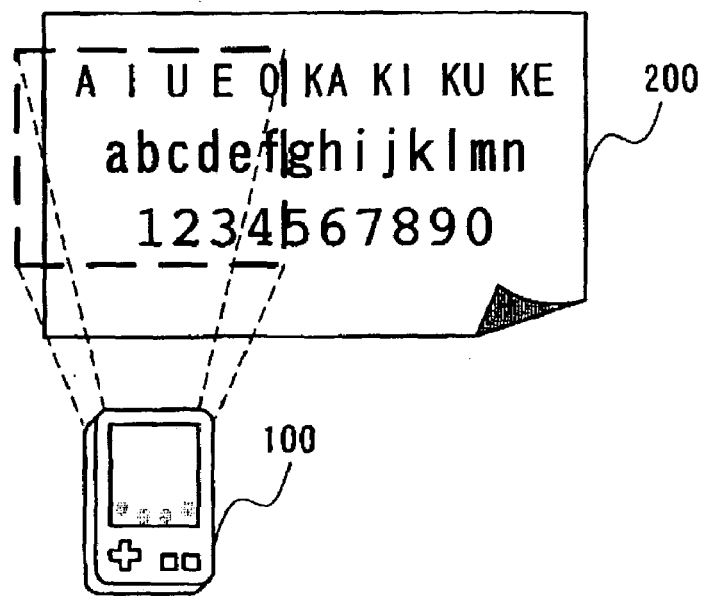
FIG. 27 is a diagram for use in explaining how the left side of a printed document is photographed in a third concrete example of the present invention.
Figure 28:
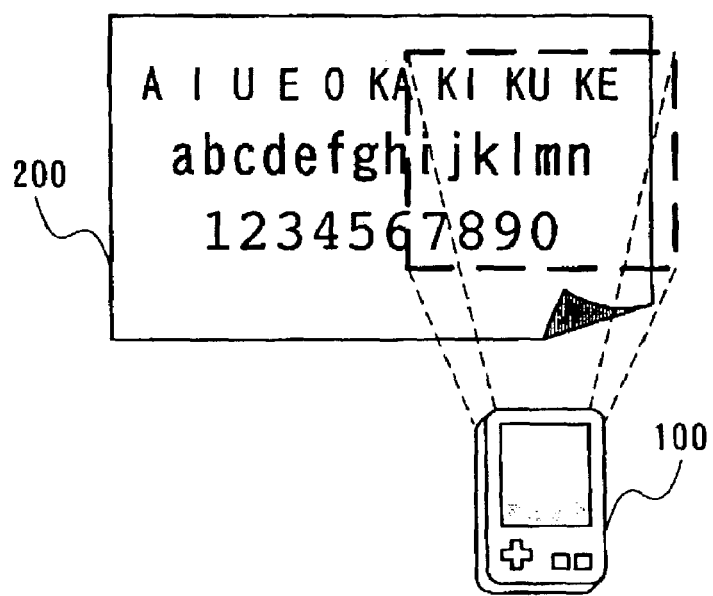
FIG. 28 is a diagram for use in explaining how the right side of the printed document is photographed in the third concrete example of the present invention.

Assume now that in order to input a printed sentence shown in FIG. 14 similarly to the first concrete example, the left half is photographed as shown in FIG. 27 and then the right half is photographed to result in such photographing as illustrated in FIG. 28 because the terminal is moved too rightward. This photographing disables synthesis because there is no overlap portion with the first input result. Therefore, character-recognition-data CR for this input is temporarily stored in the pending data storage device 70.

Figure 29:
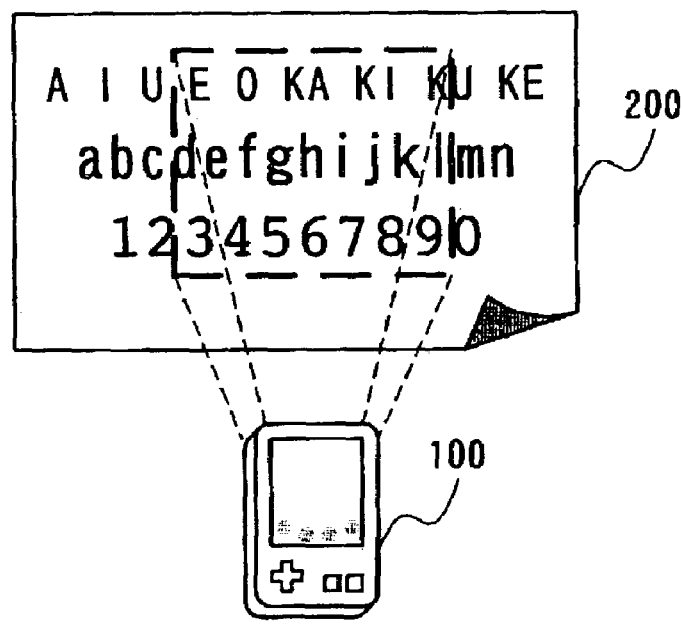
FIG. 29 is a diagram for use in explaining how the vicinity of the center of the printed document is photographed in the third concrete example of the present invention.

Assume that the user subsequently performs third photographing as illustrated in FIG. 29, it has an overlap with the first photographing to enable synthesis.

Here, synthesis of the held second character-recognition-data CR with the first and the third synthesis results is tried. In this case, an overlap portion exists to succeed in synthesis, so that the entire sentence can be input.

Next, a character input device according to a fourth embodiment will be detailed with reference to the drawings.

Figure 8:
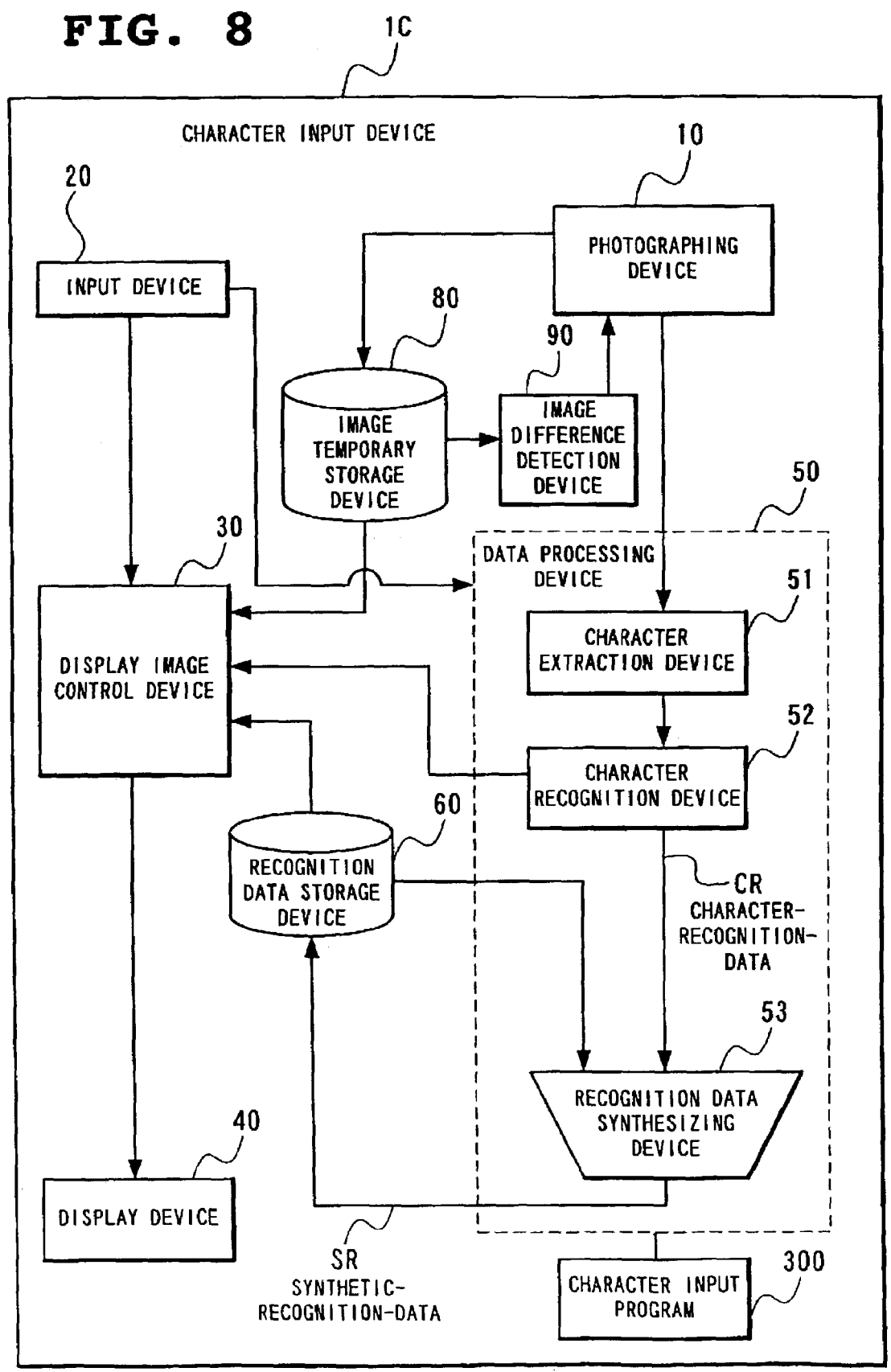
FIG. 8 is a block diagram showing a structure of a character input device according to a fourth embodiment of the present invention.

With reference to FIG. 8, a character input device 1C according to the fourth embodiment of the present invention differs from the structure of the first embodiment illustrated in FIG. 1 in further including an image temporary storage device 80 and an image difference detection device 90.

The image temporary storage device 80, which is connected to the photographing device 10, temporarily stores video output from the photographing device 10 on a frame basis.

The image difference detection device 90 is connected to the image temporary storage device 80 and the photographing device 10. The image difference detection device 90 detects the amount of movement of the photographing device 10 by taking a difference between an image of an immediately preceding frame stored in the image temporary storage device 80 and the latest frame image. By determining photographing time according to the movement of the photographing device 10 to send a photographing instruction to the photographing device 10, a still picture is photographed.

Next, operation of the character input device 1C according to the fourth embodiment will be detailed with reference to the drawings.

Figure 9:
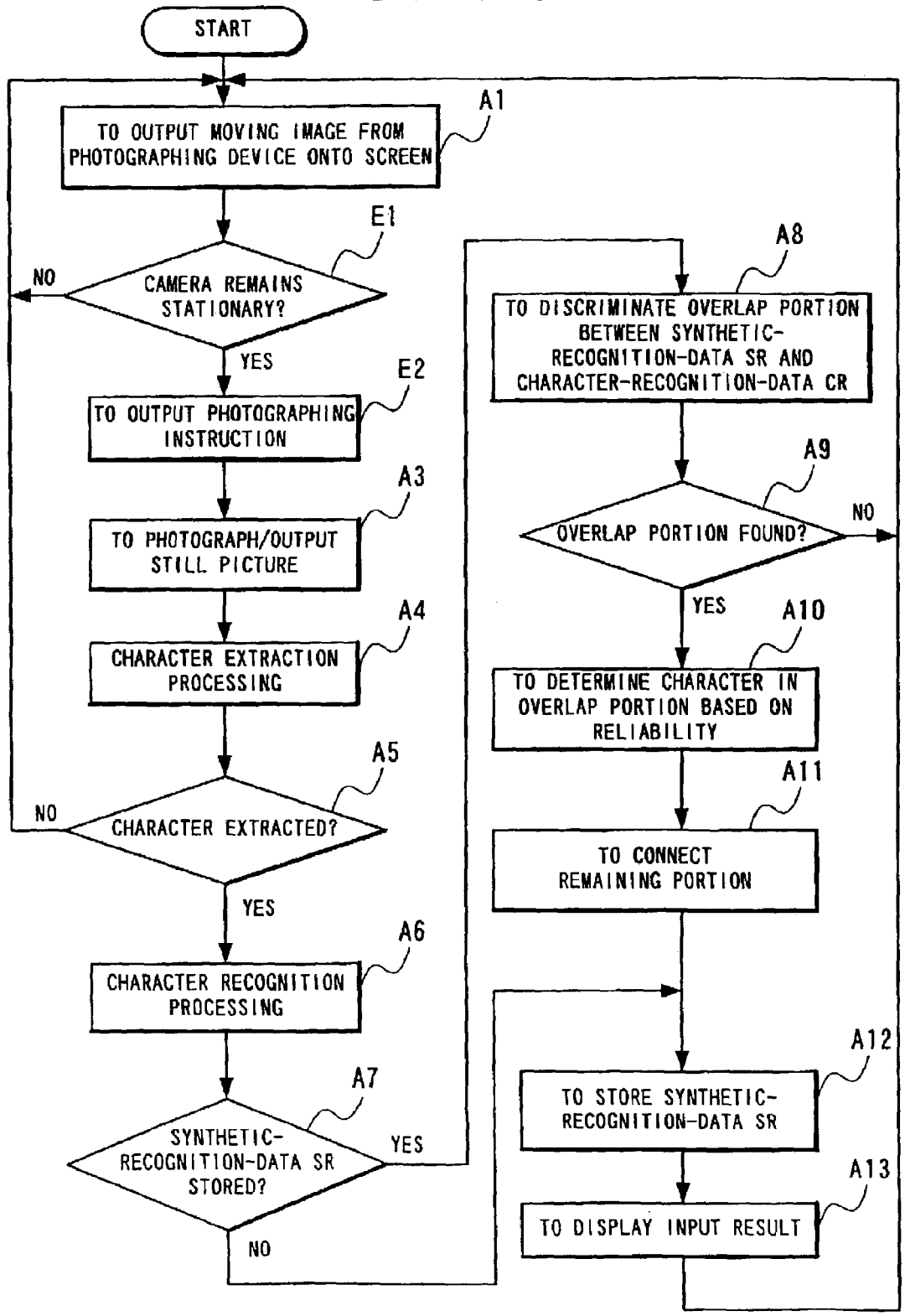
FIG. 9 is a flow chart for use in explaining operation of the fourth embodiment of the present invention.

Operation of the present embodiment shown in FIG. 9 differs from the operation of the first embodiment shown in FIG. 1 in that processing at Steps E1 and E2 is performed in place of Step A2.

In the present embodiment, while video output from the photographing device 10 is displayed in the display device 40, the image temporary storage device 80 and image difference detection device 90 calculate an amount of difference between each frame and its preceding frame to determine whether the photographing device 10 remains stationary or not based on the amount of difference (Step E1).

When the determination is made that the photographing device 10 remains stationary, the image difference detection device 90 sends a photographing instruction to the photographing device 10 (Step E2) to proceed to Step A3 where an image is automatically photographed. In other words, photographing is automatically performed without shutter operation through the input device 20.

Figure 10:
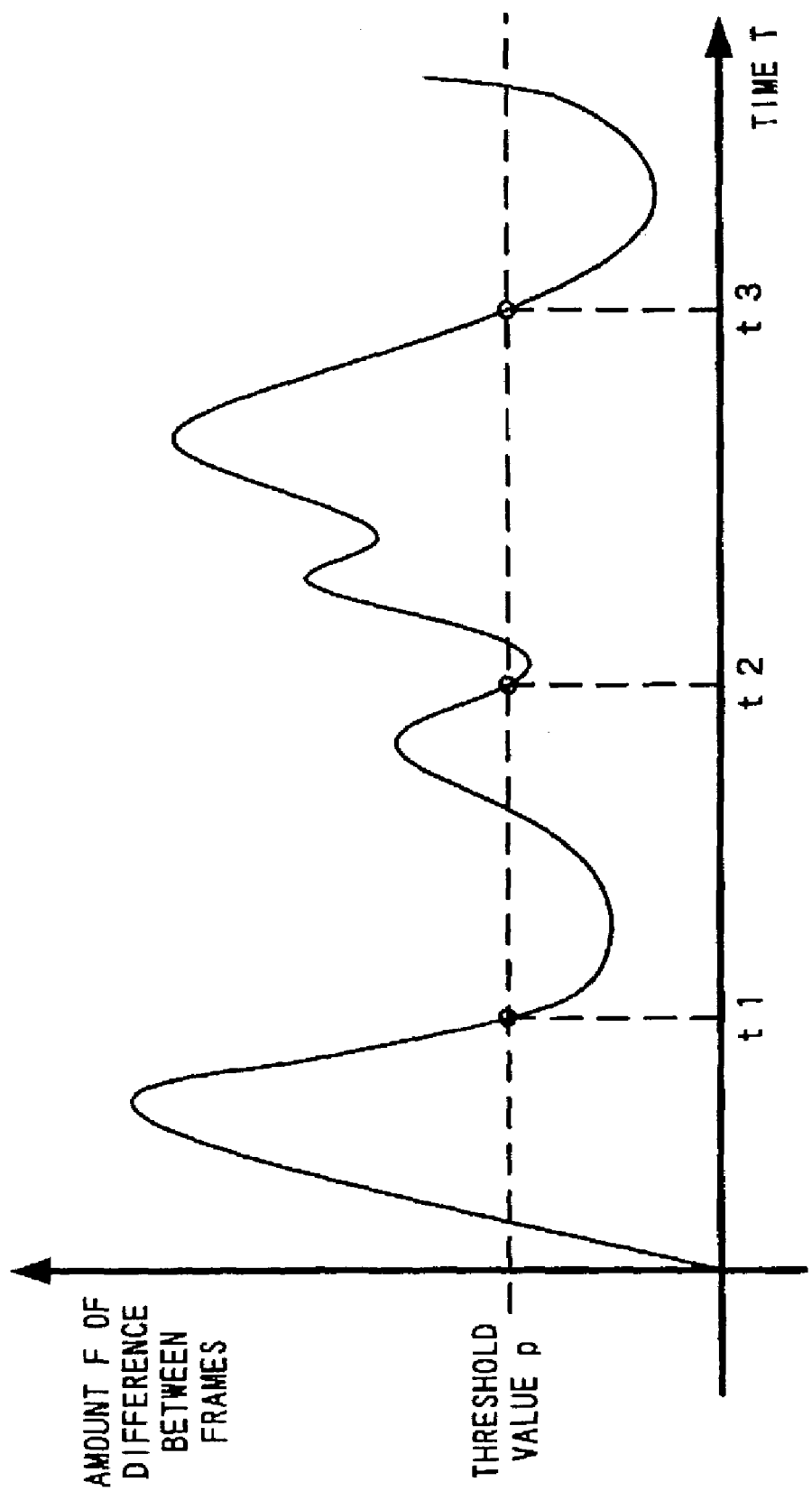
FIG. 10 is a diagram for use in explaining a first method of determining photographing timing in a photographing device according to the fourth embodiment of the present invention.

Here, as a method of determining whether the photographing device 10 remains stationary or not, it is possible, for example, as illustrated in FIG. 10, to determine that the photographing device 10 is at a stationary state (t1, t2, t3) when an amount F of difference between frames is lower than a fixed threshold value p and to automatically give a photographing instruction.

While the above-described method allows a user to quickly perform successive photographing, it may cause unexpected photographing when the photographing device 10 comes to be stationary only in a moment.

Figure 11:
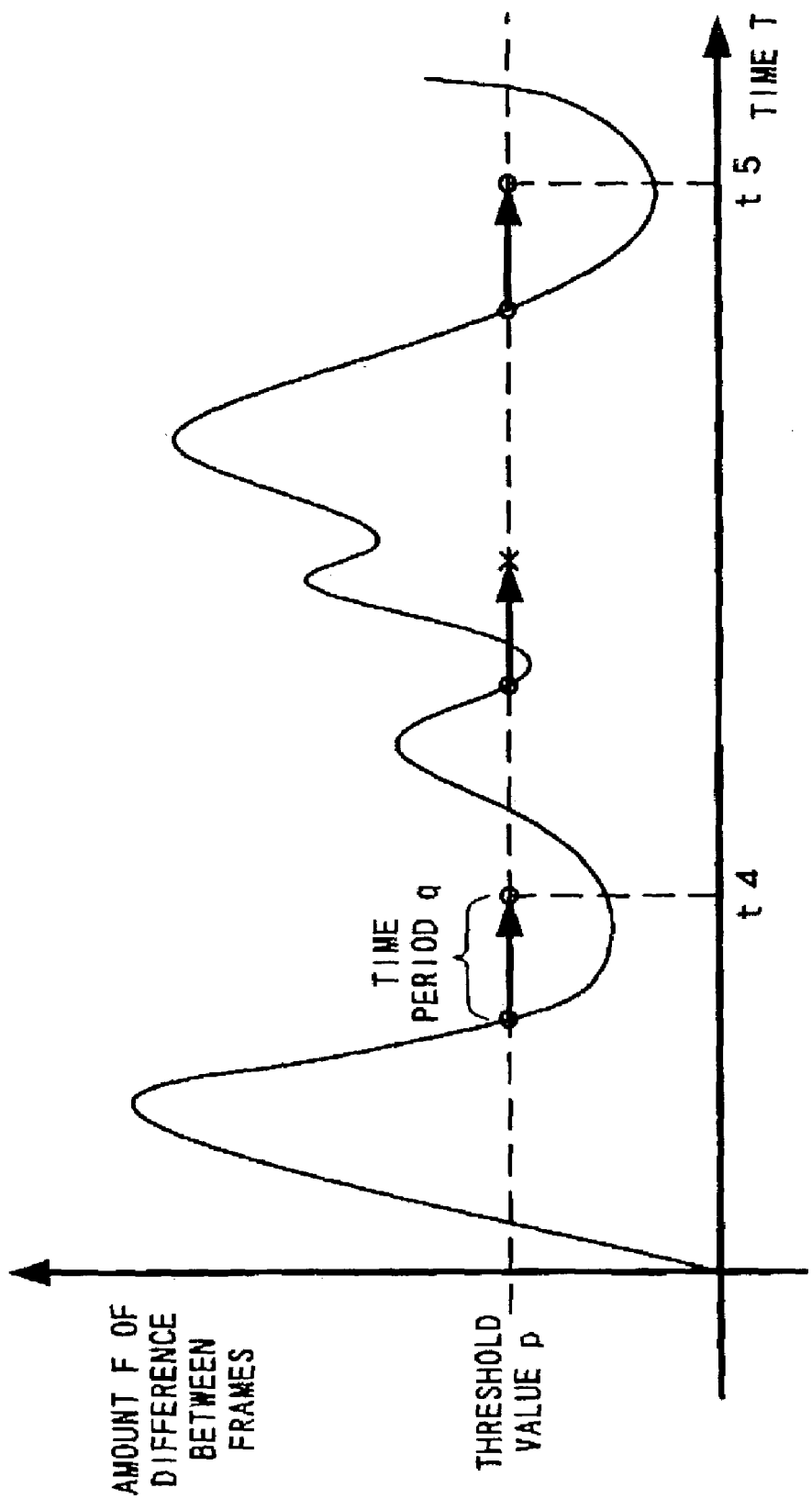
FIG. 11 is a diagram for use in explaining a second method of determining photographing timing in the photographing device according to the fourth embodiment of the present invention.

Therefore, it is also possible, for example, to perform photographing at the state (t4, t5) when an amount of difference between frames is lower than the fixed threshold p and then fails to exceed the threshold value in a fixed time q, as illustrated in FIG. 11.

With this method, photographing is performed when a user holds the photographing device 10 at a stationary state for a fixed time period, so that a photographing instruction can be made more explicitly to avoid unexpected photographing.

Effects of the fourth embodiment will be described.

In the present embodiment, an amount of movement of the photographing device 10 (for example, a camera) is detected from an image photographed by the photographing device 10 and, when the photographing device 10 comes to a stationary state, photographing is performed automatically.

This eliminates the need of tripping the shutter (giving a photographing instruction by operating the input device 20) for the purpose of photographing a document image. Therefore, it is only necessary to move the photographing device 10 to focus on a photographing target. Also in photographing a large document, photographing is performed one after another by such operation of moving the photographing device 10 vertically and horizontally and stopping to hold the device stationary at fixed intervals and an input result is displayed on the display device 40 in real time, whereby a user is allowed to input characters by photographing with more ease. In addition, camera-shake due to tripping the shutter (operating the input device 20) can be prevented.

Next, a fourth concrete example of the present invention will be described with reference to the drawings. The present example corresponds to the fourth embodiment of the present invention.

Similarly to the first example, the present example is realized by the portable terminal 100, but differs from the same in that the central processing device functions also as the image difference detection device 90 and the storage device functions as the image temporary storage device 80.

Figure 30:
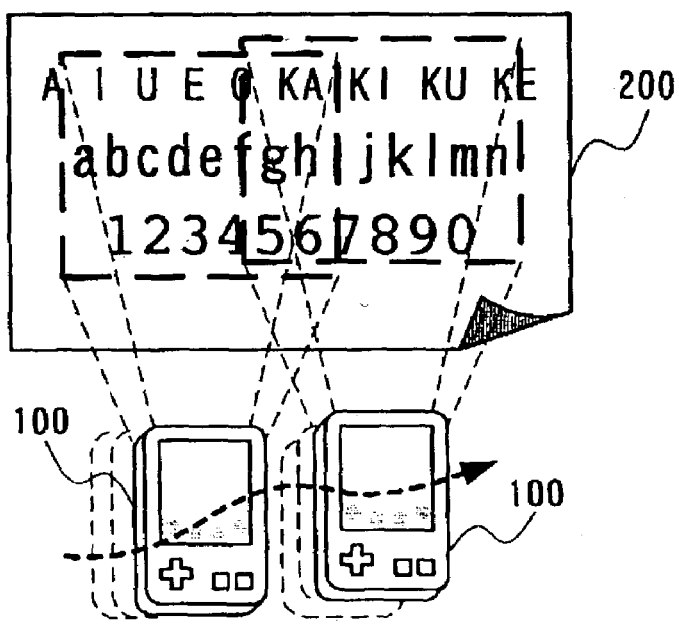
FIG. 30 is a diagram for use in explaining how automatic photographing is performed in a fourth concrete example of the present invention.

The present example differs from the first example only in that, at the time of photographing, it is only necessary to hold the terminal stationary for a little while without pressing the shutter button. As illustrated in FIG. 30, such spontaneous operation as tracing the document 200 by the portable terminal 100 leads to input. Also at the time of correcting an input error, it is only necessary to similarly return to the place of the erroneously input character and to hold the portable terminal 100 stationary.

Next, a character input device according to a fifth embodiment of the present invention will be detailed with reference to the drawings.

Figure 31:
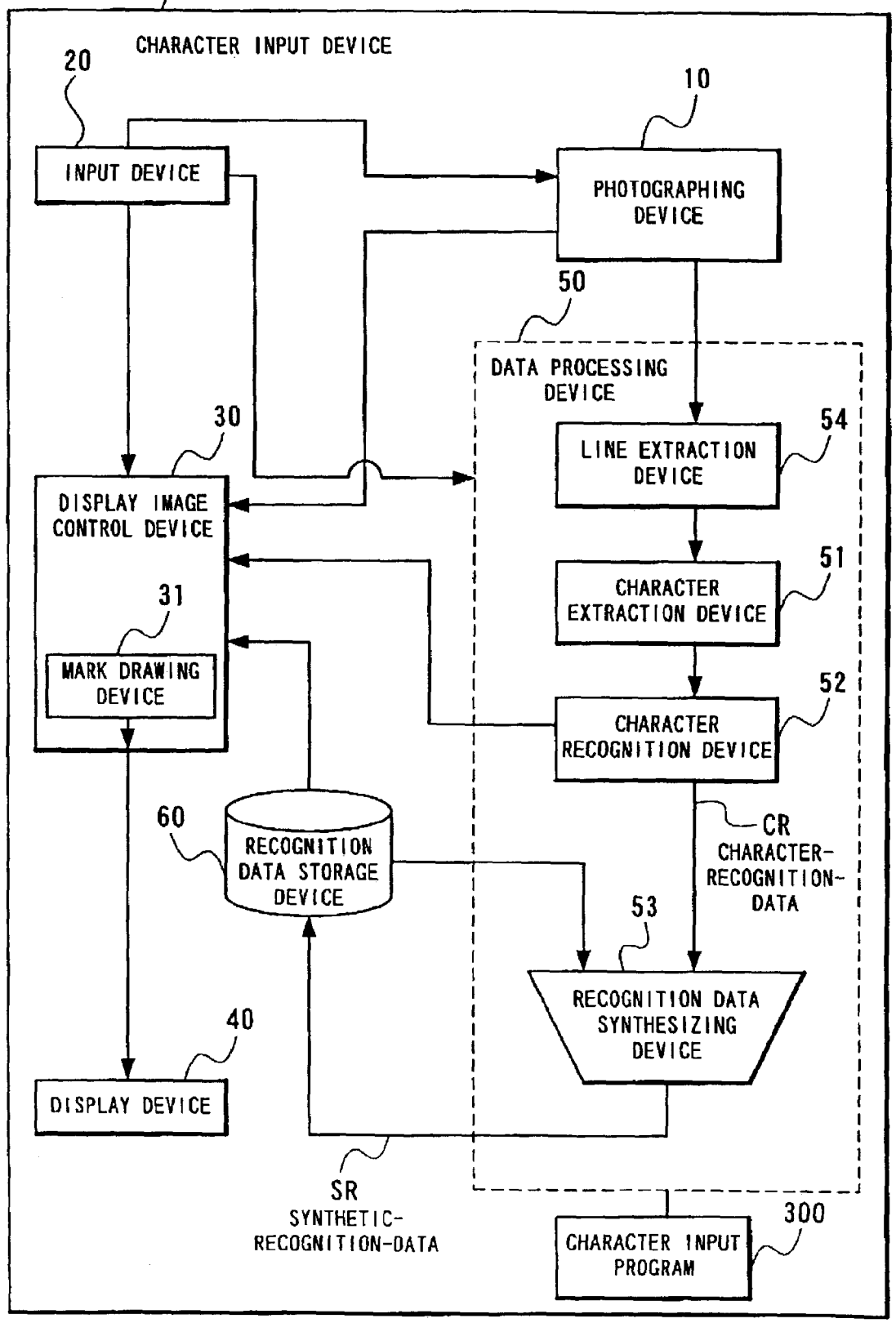
FIG. 31 is a block diagram showing a structure of a character input device according to a fifth embodiment of the present invention.

With reference to FIG. 31, a character input device 1E according to the fifth embodiment of the present invention differs from the structure of the first embodiment shown in FIG. 1 in including a mark drawing device 31 and a line extraction device 54.

The mark drawing device 31 of the display image control device 30 has a function of drawing a mark on a previewing image sent from the photographing device 10 at which mark a user locates a target character for the photographing.

The line extraction device 54 of the data processing device 50, which is connected to the photographing device 10, has a function of extracting line image from the whole image photographed by the photographing device 10 on a line basis and sending extracted line images to the character extraction device 51.

Next, operation of the character input device 1E according to the fifth embodiment will be detailed with reference to the drawings.

Figure 32:
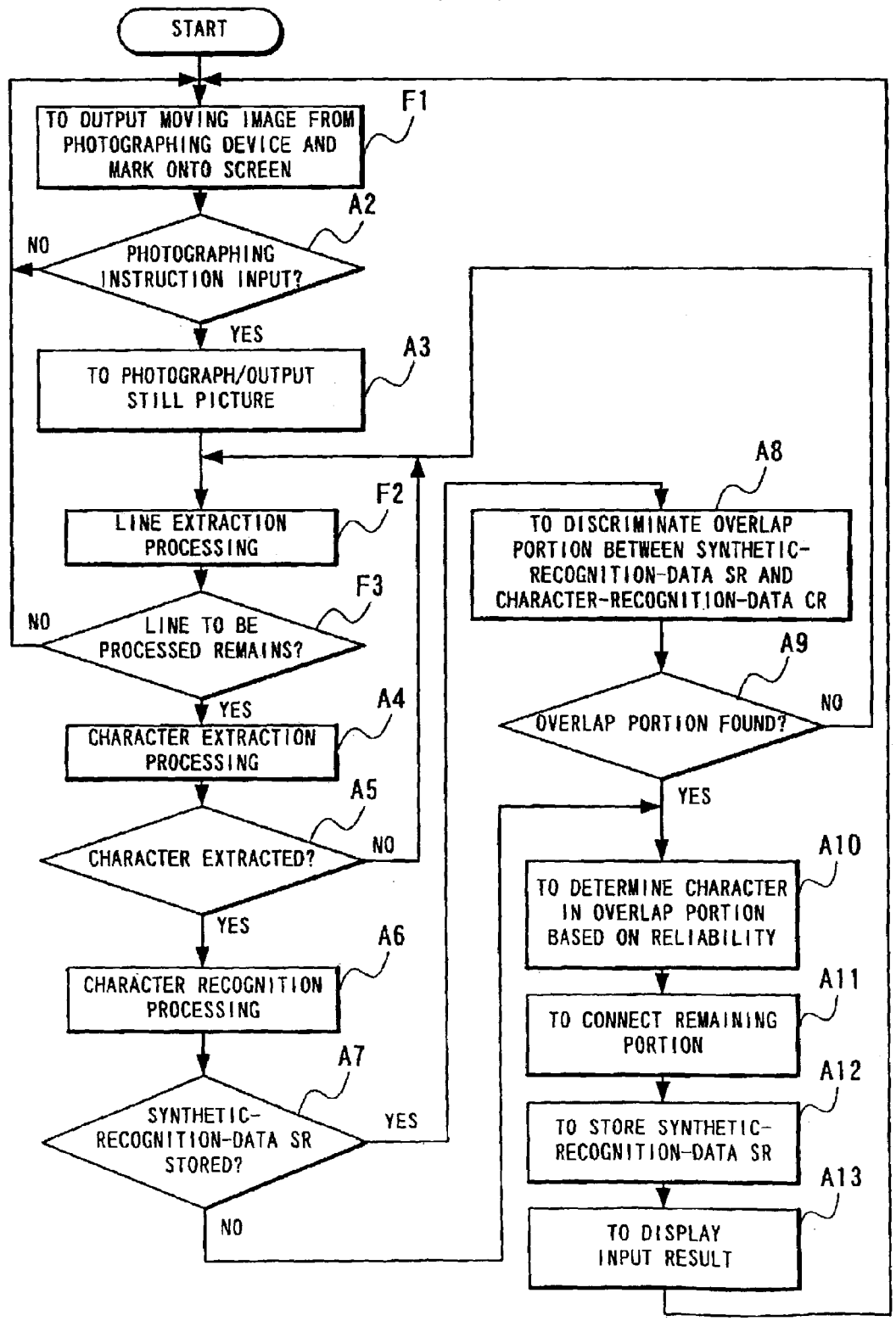
FIG. 32 is a flow chart for use in explaining operation of the fifth embodiment of the present invention.

In the operation of the present embodiment shown in FIG. 32, since operation at Steps A2 and A3, Steps A6 to A8 and Steps A10 to A13 is the same as that of the first embodiment shown in FIG. 2, no description will be made thereof.

When the present device starts operation, previewing images from the photographing device 10 are sent to the display image control device 30. The mark drawing device 31 of the display image control device 30 draws a mark at a specific position of the images, which are displayed in the display device 40 (Step F1).

When photographing operation is executed, the photographed image output from the photographing device 10 is first sent to the line extraction device 54. The line extraction device 54 extract line images from the received image and sends a line image to the character extraction device 51 (Step F2). This line extraction processing can be realized, for example, by such a conventional technique as recited in Japanese Patent Laying-Open (Kokai) No. Heisei 05-182024

When no character is extracted at Step A5 or when no overlap portion is found between synthetic-recognition-data SR and character-recognition-data CR at Step A9, the line extraction device 54 extracts a line image nearest to the mark drawn by the mark drawing device 31 next to the line image processed this time and sends it again to the character extraction device 51. If no other line image to be processed exists, return to Step F1 (Step F3).

Next, effects of the fifth embodiment will be described.

In the present embodiment, an image photographed by the photographing device 10 is first divided into line images to extract and process a line image nearest to the mark displayed on the screen.

This procedure enables a user to input a character string as a part of a document by simple operation of locating a target character string at a mark on a screen and photographing the same.

At the time of divisional photographing, when character-recognition-data CR of the line image nearest to the mark can not be synthesized with synthetic-recognition-data SR obtained so far, other line images are examined to be synthesized. As a result, once a beginning of a target character string is input, it is not necessary to precisely put the character string at the mark in the photographing to follow. In addition, since lines images are extracted and processed in order nearest to the mark, as long as a user puts a character string in the vicinity of the mark, a target character string can be searched and synthesized with a reduced amount of processing.

Next, a fifth concrete example of the present invention will be described with reference to the drawings. The present example corresponds to the fifth embodiment of the present invention.

Although the present concrete example is realized by the portable terminal 100 similarly to the first concrete example, it differs in that the central processing device functions also as the line extraction device 54 and the mark drawing device 31.

Figure 37:
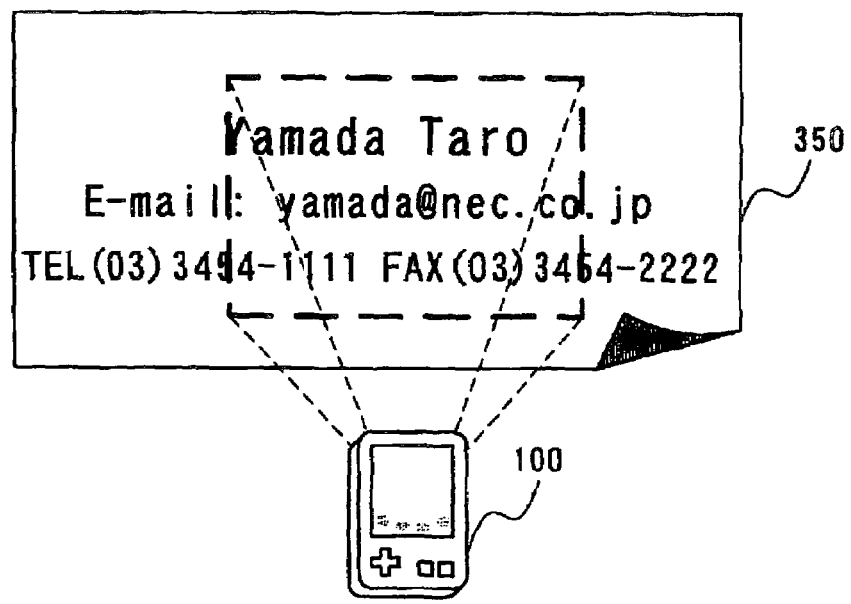
FIG. 37 is a diagram for use in explaining how the left side of a mail address on a name card is photographed in a fifth concrete example of the present invention.

In the present example, consider a case where such a mail address "yamada@nec.co.jp" in a name card 350 is input as illustrated in FIG. 37.

Figure 38:
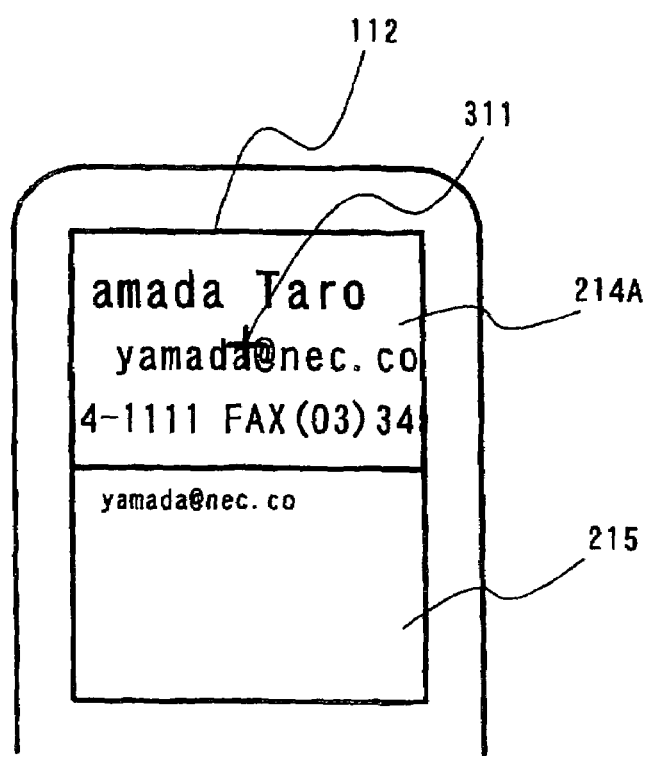
FIG. 38 is a diagram for use in explaining how an input result of the left side of the mail address on the name card is displayed in the fifth concrete example of the present invention.

On the liquid crystal display 112 of the portable terminal 100, previewed or photographed image 214A from the camera 113 and a mark 311 of the cross as a mark for designating a photographing target are displayed as shown in FIG. 38. In the following concrete examples to the seventh concrete example, it is assumed that before tripping the shutter of the camera 113, preview images from the camera 113 are displayed on the liquid crystal display 112 in real-time and when the shutter is tripped, a still image then photographed will be displayed.

When the camera position is adjusted such that the first half of the mail address is located at the mark 311 to perform photographing, a photographed image is subjected to line extraction processing and a line nearest to the mark is subjected to recognition processing, whereby the recognition result is displayed.

Figure 39:
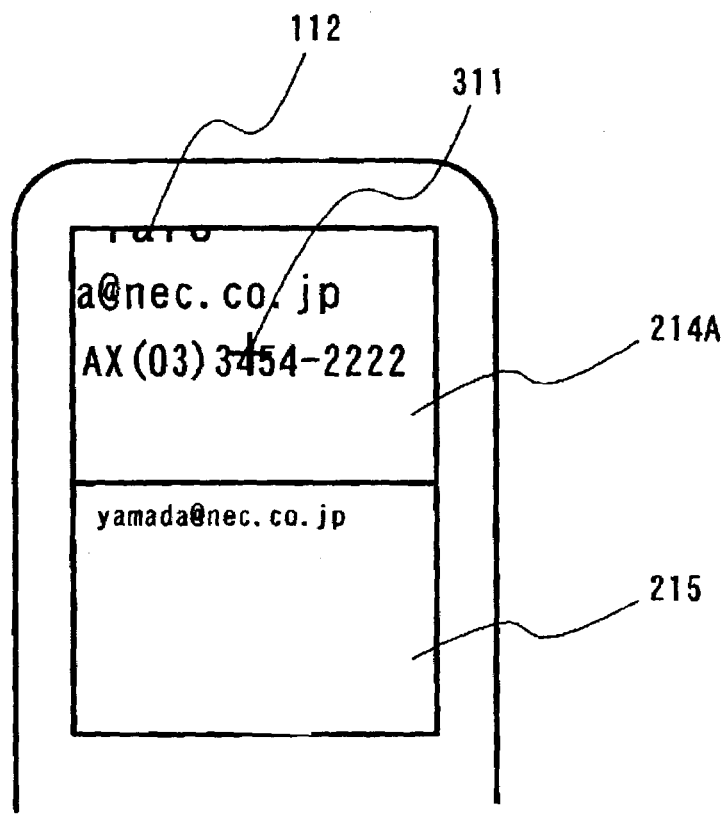
FIG. 39 is a diagram for use in explaining how an input result of the right side of the mail address on the name card is displayed in the fifth concrete example of the present invention.

At the time of photographing the latter half of the mail address, it is no more necessary to precisely locate the mail address at the mark. Namely, it is only necessary that the mail address is within the screen as illustrated in FIG. 39.

The data processing device 50 extracts line images from a photographed image and tries to connect extracted lines sequentially starting with a line nearest to the mark. In the present example, the device first tries to connect a character string "AX(03)3454-2222", but this connection fails because no overlap exists. Therefore, connection of a character string "a@nec.co.jp" is then tried to succeed. The mail address can be thus correctly input.

Next, a character input device according to a sixth embodiment of the present invention will be described in detail with reference to the drawings.

The character input device according to the sixth embodiment of the present invention differs from the structure of the first embodiment shown in FIG. 1 only in the structure of the recognition data synthesizing device 53 and therefore description of the remaining components will be omitted.

Figure 33:
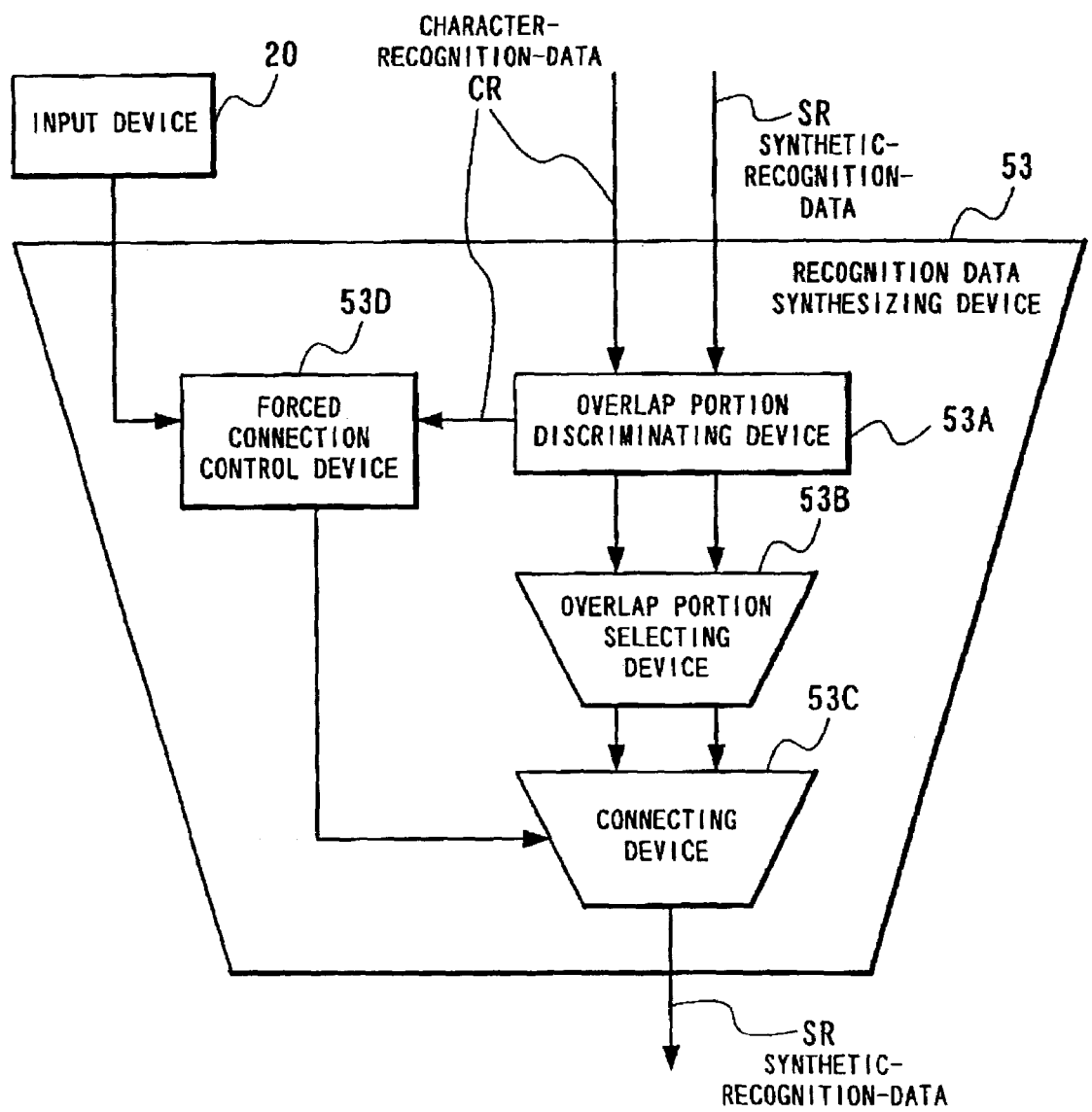
FIG. 33 is a block diagram showing a structure of a recognition data synthesizing device in a character input device according to a sixth embodiment of the present invention.

With reference to FIG. 33, while the recognition data synthesizing device 53 in the sixth embodiment includes an overlap portion discriminating device 53A, an overlap portion selecting device 53B and a connecting device 53C which are all included in the recognition data synthesizing device 53 of the first embodiment, the present embodiment differs in further including a forced connection control device 53D.

The overlap portion discriminating device 53A has a function of discriminating an overlap portion between character-recognition-data CR and synthetic-recognition-data SR, which corresponds to Step A9 in the operation of the first embodiment shown in FIG. 2.

The overlap portion selecting device 53B has a function of selecting high reliable data within the overlap portion between character-recognition-data CR and synthetic-recognition-data SR to synthesize them and of sending the remaining part of the character-recognition-data CR and the synthetic-recognition-data SR to the connecting device 53C. This function corresponds to Step A10 in the operation of the first embodiment shown in FIG. 2.

The connecting device 53C has a function of connecting character-recognition-data CR after synthetic-recognition-data SR, which corresponds to Step A11 in the operation of the first embodiment shown in FIG. 2.

The forced connection control device 53D is connected to the overlap portion discriminating device 53A and the input device 20. The forced connection control device 53D has a function of sending the character-recognition-data CR to the connecting device 53C when it is determined that no overlap portion exists between synthetic-recognition-data SR and character-recognition-data CR.

Next, operation of a character input device 2A according to the sixth embodiment will be detailed with reference to the drawings.

Figure 34:
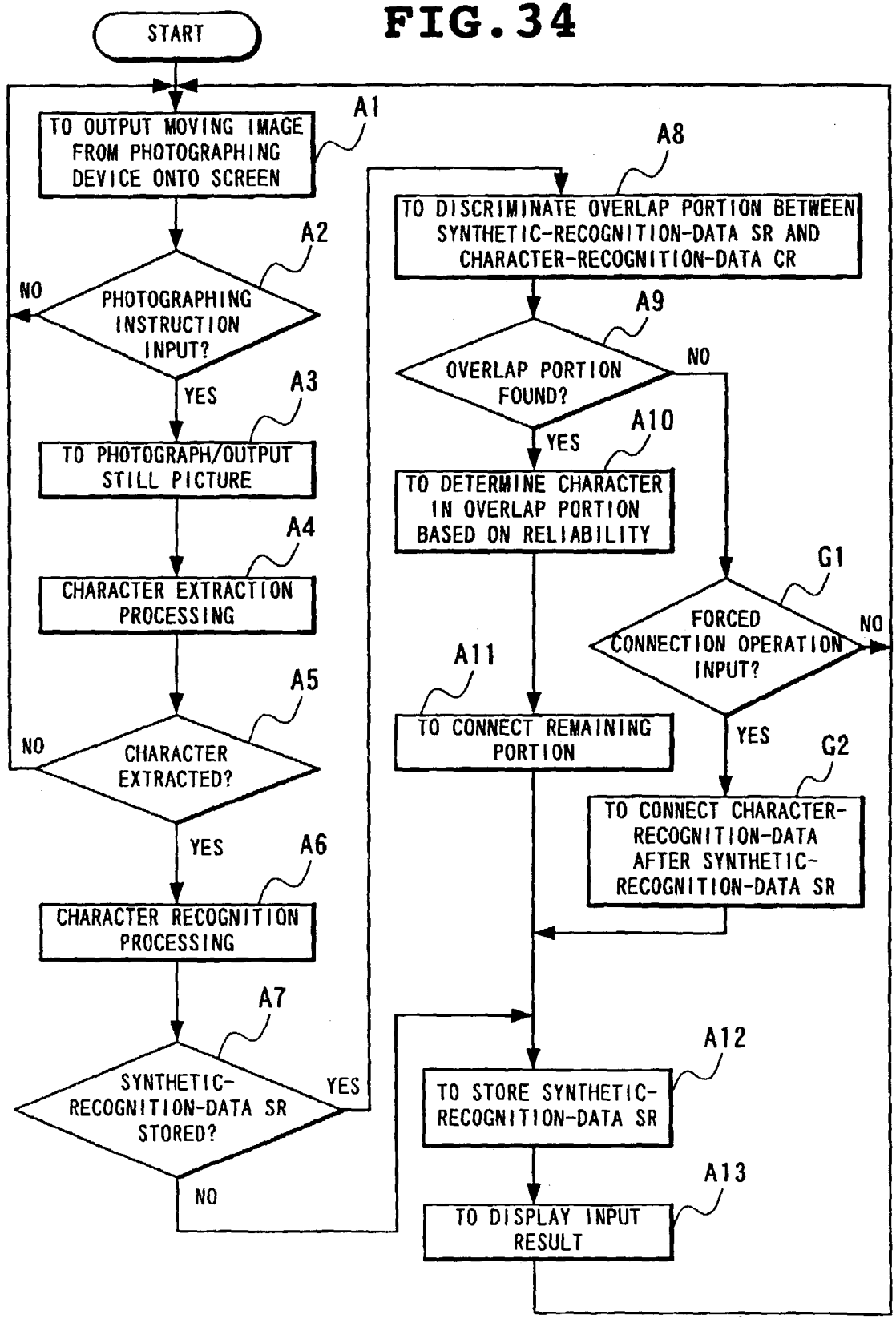
FIG. 34 is a flow chart for use in explaining operation of the sixth embodiment of the present invention.

In the operation of the present embodiment shown in FIG. 34, since operation at Steps A1 to A8 and Steps A10 to A13 is the same as that of the first embodiment shown in FIG. 2, no description will be made thereof.

At Step A9, as a result of search for an overlap portion between synthetic-recognition-data SR and character-recognition-data CR, when an overlap portion is found, proceed to Step A10 to perform synthesis. While when no overlap portion is found, a message inquiring of a user is displayed whether forced connection is to be performed or not. When the user selects performing no forced connection, again return to Step A1 (Step G1).

When the user selects performing forced connection, the character-recognition-data CR is sent to the connecting device 53C through the forced connection control device 53D.

The connecting device 53C simply connects the character-recognition-data CR sent from the forced connection control device 53D with synthetic-recognition-data SR sent from the recognition data storage device 60 and then stores the connected data in the recognition data storage device 60 (Step G2).

Next, effects of the sixth embodiment will be described.

In the present embodiment which includes the forced connection control device 53D, when synthesis of character-recognition-data CR fails, the character-recognition-data CR can be connected with synthetic-recognition-data SR without any overlap by a user's instruction.

This enables, even when a character string is printed as several line images, the whole of the character string to be input as one string by forcedly connecting the lines.

Although the effect of the forced connection processing according to the present embodiment is exerted particularly when inputting a character string written with a line feed, exertion is not limited to such a case and it is also effective, for example, when the first column of a two column document is input at first and then the second column is input.

Next, a sixth concrete example of the present invention will be described with reference to the drawings. The present concrete example corresponds to the sixth embodiment of the present invention.

The present concrete example is realized by the portable terminal 100 similarly to the first concrete example, but differs in that the central processing device functions also as the forced connection control device 53D.

Figure 40:
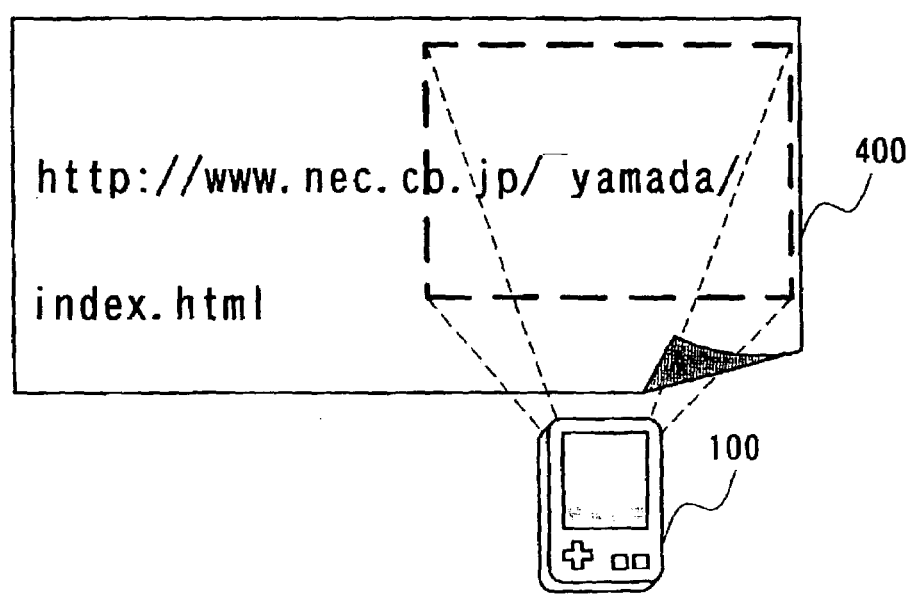
FIG. 40 is a diagram for use in explaining how the first line of a card in which URL printed is photographed in a sixth concrete example of the present invention.

In the present concrete example, consideration will be given to a case where such a URL written on a card 400 as illustrated in FIG. 40 is input.

Figure 41:
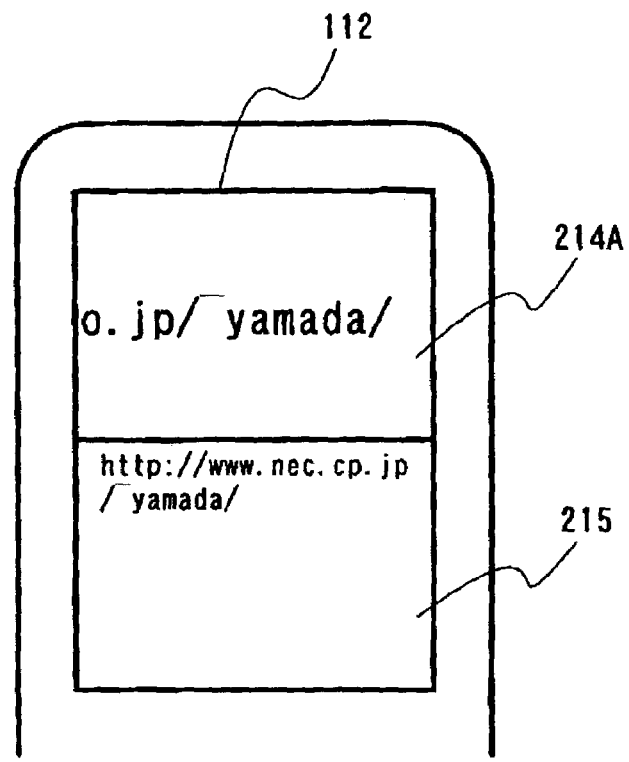
FIG. 41 is a diagram for use in explaining how an input result of the first line of the card in which URL printed is displayed in the sixth concrete example of the present invention.

Similarly to the first concrete example, assume that the URL is sequentially photographed from the left up to the right end of the first line as illustrated in FIGS. 40 and 41.

Figure 42:
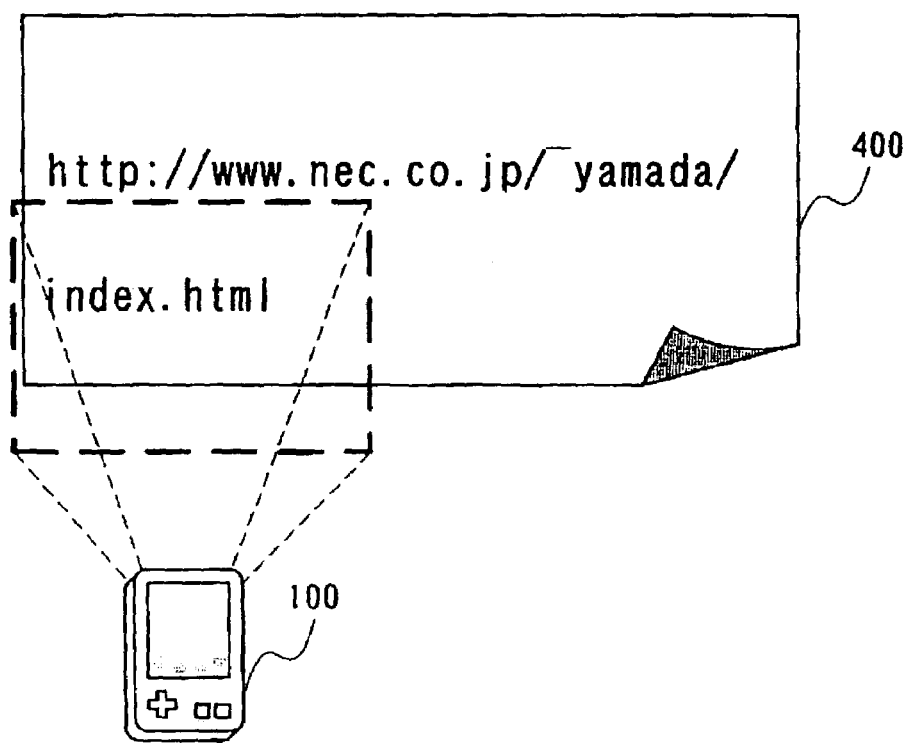
FIG. 42 is a diagram for use in explaining how the second line of the card in which URL printed is photographed in the sixth concrete example of the present invention.
Figure 43:
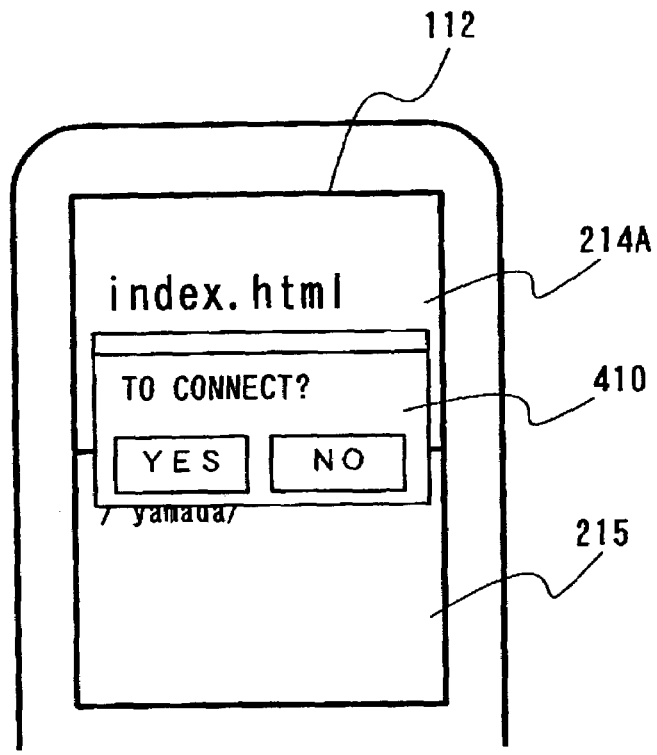
FIG. 43 is a diagram for use in explaining how a message for inquiring whether forced connection processing is allowed or not is in the six concrete example of the present invention.

Here, as shown in FIG. 42, when the following part of the URL printed in the second line is photographed, such a connection confirmation message 410 as shown in FIG. 43 is displayed because no overlap portion exists between character-recognition-data CR obtained this time and stored synthetic-recognition-data SR.

Figure 44:
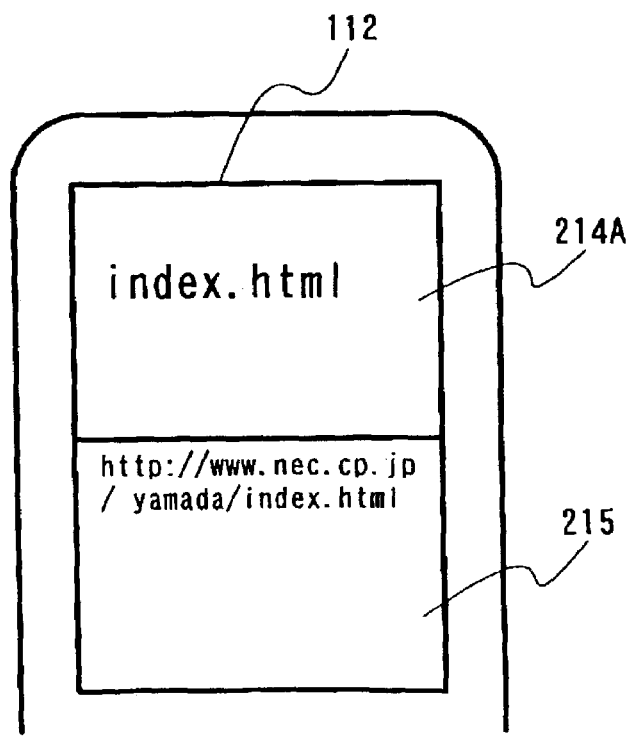
FIG. 44 is a diagram for use in explaining a result of the forced connection processing in the sixth concrete example of the present invention.

Upon selecting "YES" to instruct on forced connection here, the character-recognition-data CR is connected to the end of the stored synthetic-recognition-data SR to result in inputting such URL printed with a line feed as one character string as shown in FIG. 44.

Next, a character input device according to a seventh embodiment of the present invention will be detailed with reference to the drawings.

Figure 35:
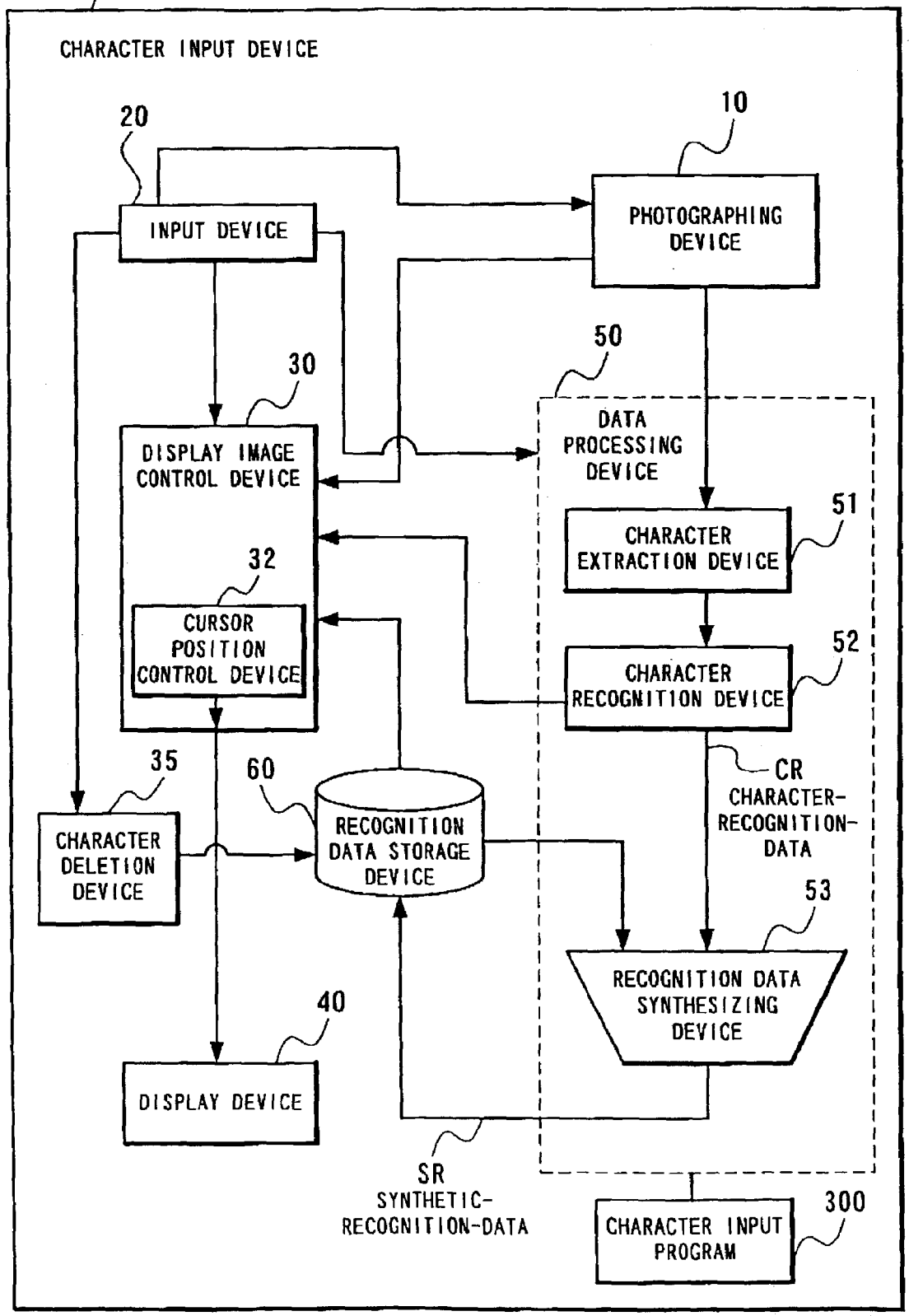
FIG. 35 is a block diagram showing a structure of a character input device according to a seventh embodiment of the present invention.

With reference to FIG. 35, a character input device 1F according to the seventh embodiment of the present invention differs from that of the fifth embodiment in that in the structure of the first embodiment shown in FIG. 1, a cursor position control device 32 is provided in the display image control device 30 and a character deletion device 35 is connected to the recognition data storage device 60.

The cursor position control device 32 determines whether current input is the first photographing or not. When it is true, the cursor is moved to the beginning of the character string recognized and otherwise the cursor is moved to the end in the display device 40.

The character deletion device 35 has a function of deleting a character of synthetic-recognition-data SR stored in the recognition data storage device 60.

Operation of the character input device 1F according to the present embodiment will be described with reference to the drawings.

Figure 36:
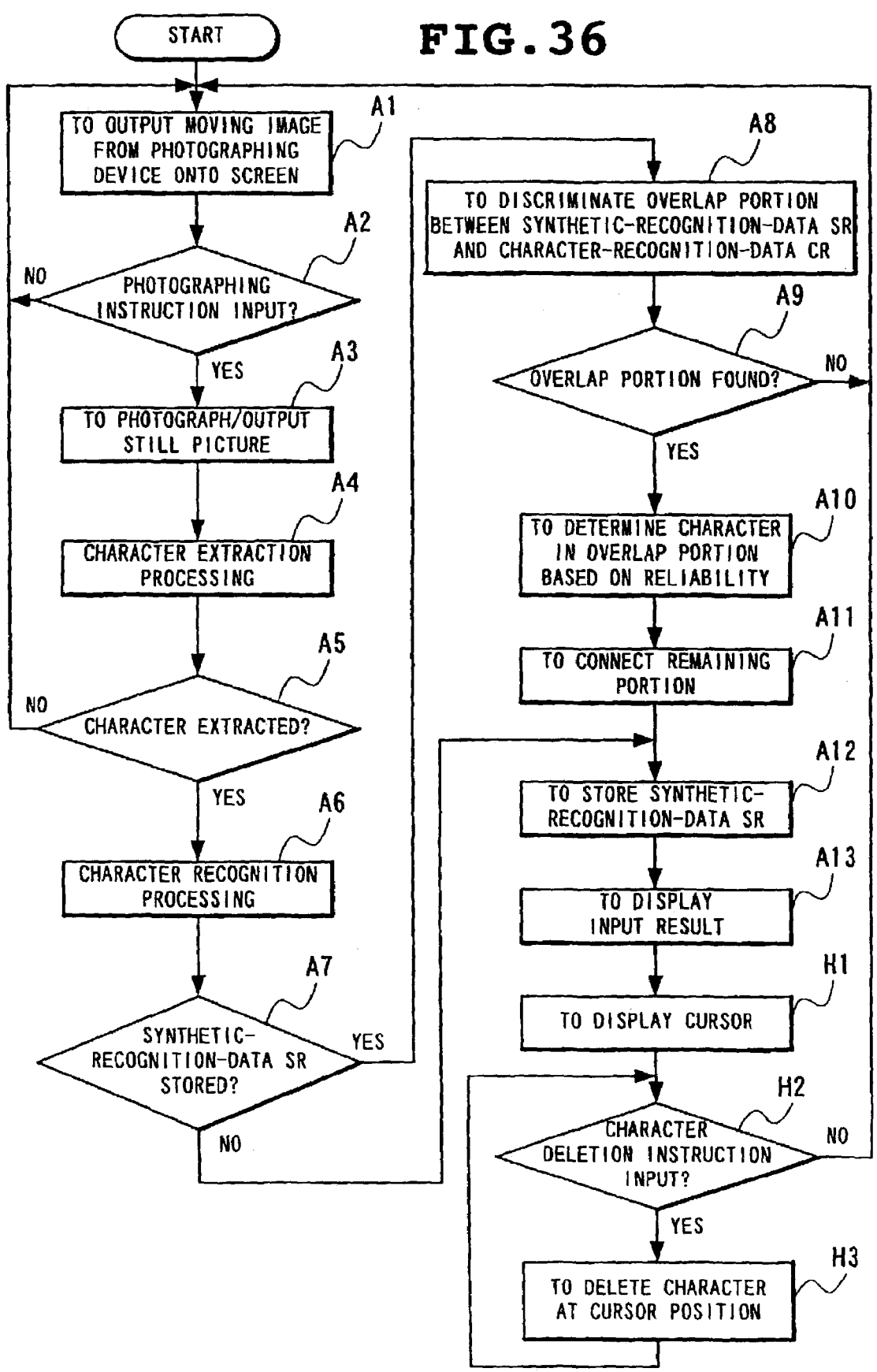
FIG. 36 is a flow chart for use in explaining operation of the seventh embodiment of the present invention.

FIG. 36 is a flow chart showing operation of the character input device 1F according to the seventh embodiment. Here, the operation of the present embodiment differs from that of the first embodiment of the present invention shown in FIG. 2 in that Step H1 to Step H3 are performed after Step A13. Description of steps common to those in FIG. 2 is therefore omitted.

After an input result is displayed at Step A13, the cursor position control device 32 further displays a cursor located at a certain character in the input result (Step H1).

Here, when the present photographing is the first input, that is, when nothing is stored in the recognition data storage device 60, the cursor is located at the beginning of the input character string.

This enables a user to delete with ease unnecessary character(s) which is/are likely to be photographed together at the left-hand end of the target character string.

When the present photographing is the second or the following photographing, the cursor is located at the end of the input character string.

This enables the user to delete with ease unnecessary character(s) which is/are likely to be photographed together at the right-hand end of the target character string in the last photographing of divisional photographing.

Next, when character deletion operation through the input device 20 is performed, one character at the position of the cursor is deleted to shift the remaining part of the character string to the left by one character. When the deleted character is the last character of the recognition result, one character at the position of the cursor is deleted to move the cursor to the left by one character. Character deletion operation can be successively performed. When character deletion operation ends, return to camera video output (Steps H2, H3).

Being combined with the second embodiment, the present embodiment enables both deletion and correction of a character at the position of the cursor.

In such a case, when last photographing is re-photographing of returning to the place photographed so far, in addition to the above-described operation, it is better that the cursor position control device 32 should move the cursor to a character nearest to the center in the last photographing similarly to the second embodiment.

This is more desirable because it enables, in addition to user's deletion of unnecessary characters before and after a target character string with ease, erroneously recognized character to be quickly corrected when return-photographing is performed.

Next, effects of the seventh embodiment will be described.

The present embodiment, which includes the cursor position control device 32 and the character deletion device 35, enables a character at the position of the cursor to be deleted by user's operation. Here, since the cursor is at the beginning of the character string at the first photographing and it moves to the end of the character string in the following photographing, the user is allowed to delete unnecessary character(s) before and after the target character string by simple operation of pressing a deletion key one or more times, resulting in improving operability.

Next, a seventh concrete example of the present invention will be described with reference to the drawings. The present concrete example corresponds to the seventh embodiment of the present invention.

Similarly to the first concrete example, the present concrete example is realized by the portable terminal 100, but differs in that the central processing device functions also as the cursor position control device 32.

Figure 45:
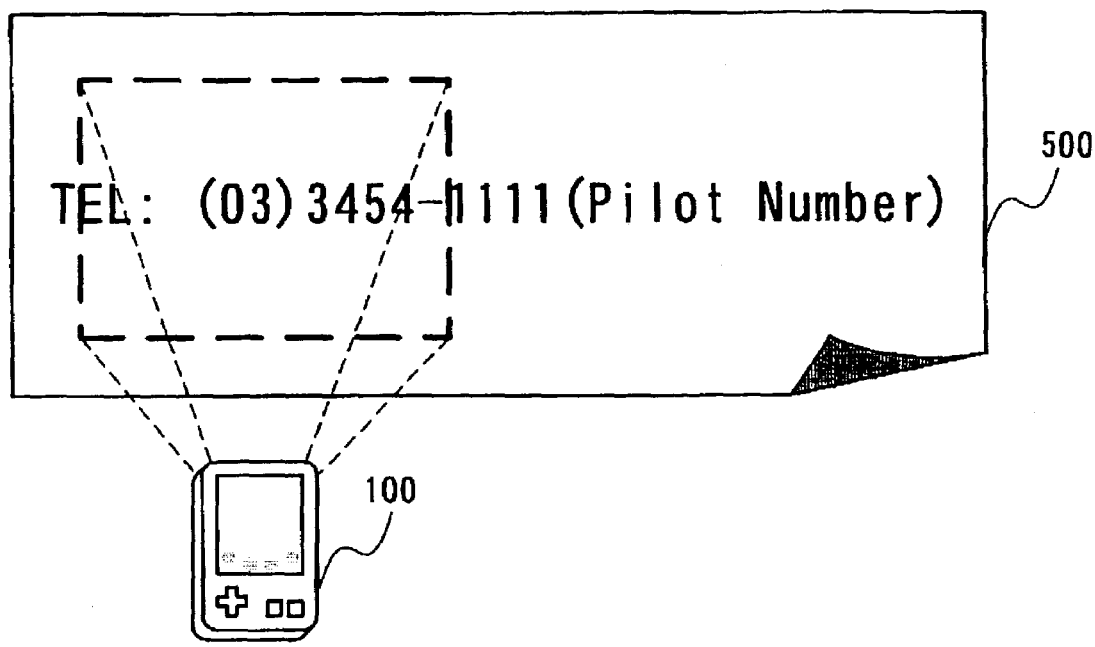
FIG. 45 is a diagram for use in explaining how the left side of a card on which a telephone number is printed is photographed in a seventh concrete example of the present invention.

In the present concrete example, consideration will be given to a case where such a telephone number written on a card 500 as shown in FIG. 45 is input.

Figure 46:
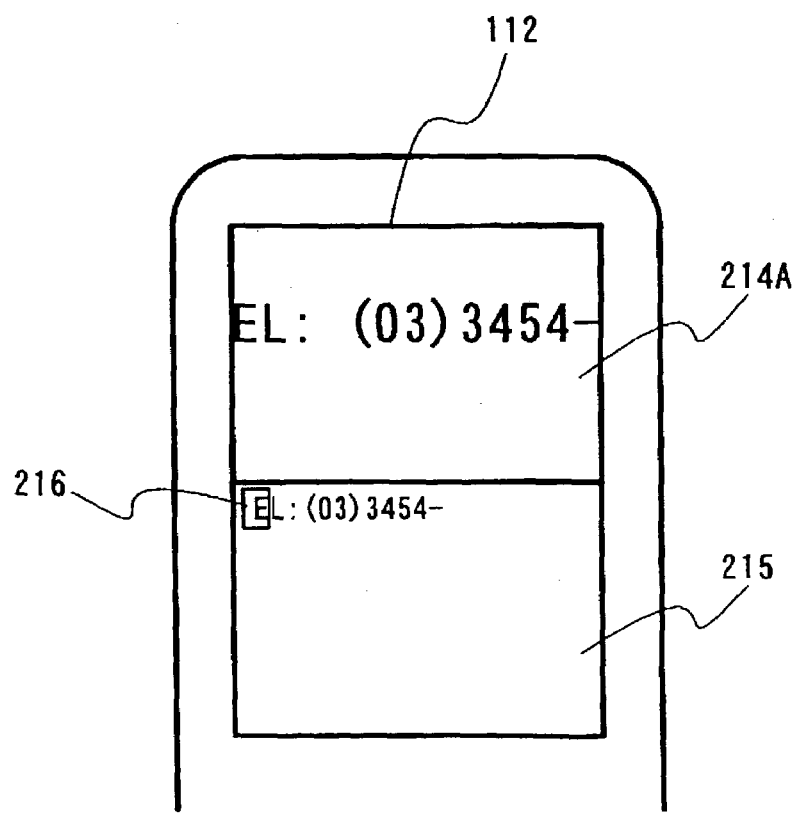
FIG. 46 is a diagram for use in explaining how an input result of the left side of the card on which the telephone number is printed is displayed in the seventh concrete example of the present invention.

Assume that when the first half of the telephone number is first photographed to result in photographing a character string "EL:" printed to the left hand together with the telephone number to include the same into a recognition result as shown in FIG. 46.

Here, the cursor position control device 32 determines that the present photographing is the first photographing because no data is being stored in the synthesis data storage device, and moves the cursor 216 to the beginning of the recognition result character string.

Figure 47:
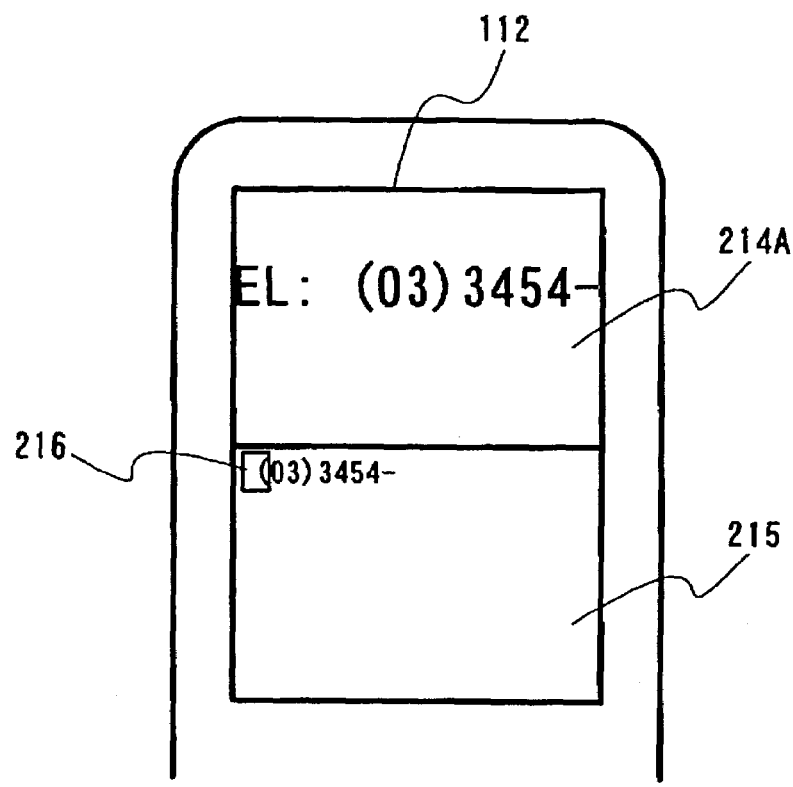
FIG. 47 is a diagram for use in explaining how an unnecessary character entered in the left part of the input result of the telephone number is deleted in the seventh concrete example of the present invention.

The user looks at the recognition result and can delete "EL:" only by pressing the deletion key three times, as illustrated in FIG. 47.

Figure 48:
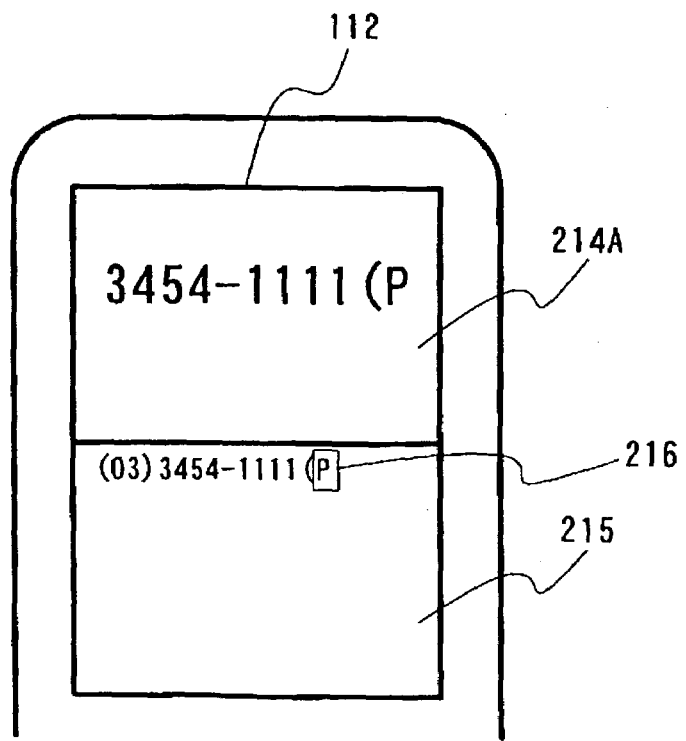
FIG. 48 is a diagram for use in explaining how an input result of the right side of the card on which the telephone number is printed is displayed in the seventh concrete example of the present invention.

Next, assume that the latter half of the telephone number is photographed to includes additional characters "(P" printed after the telephone number as shown in FIG. 48.

The cursor position control device 32 moves the cursor 216 to the end of the recognition result string because the synthetic-recognition-data SR is updated now.

Figure 49:
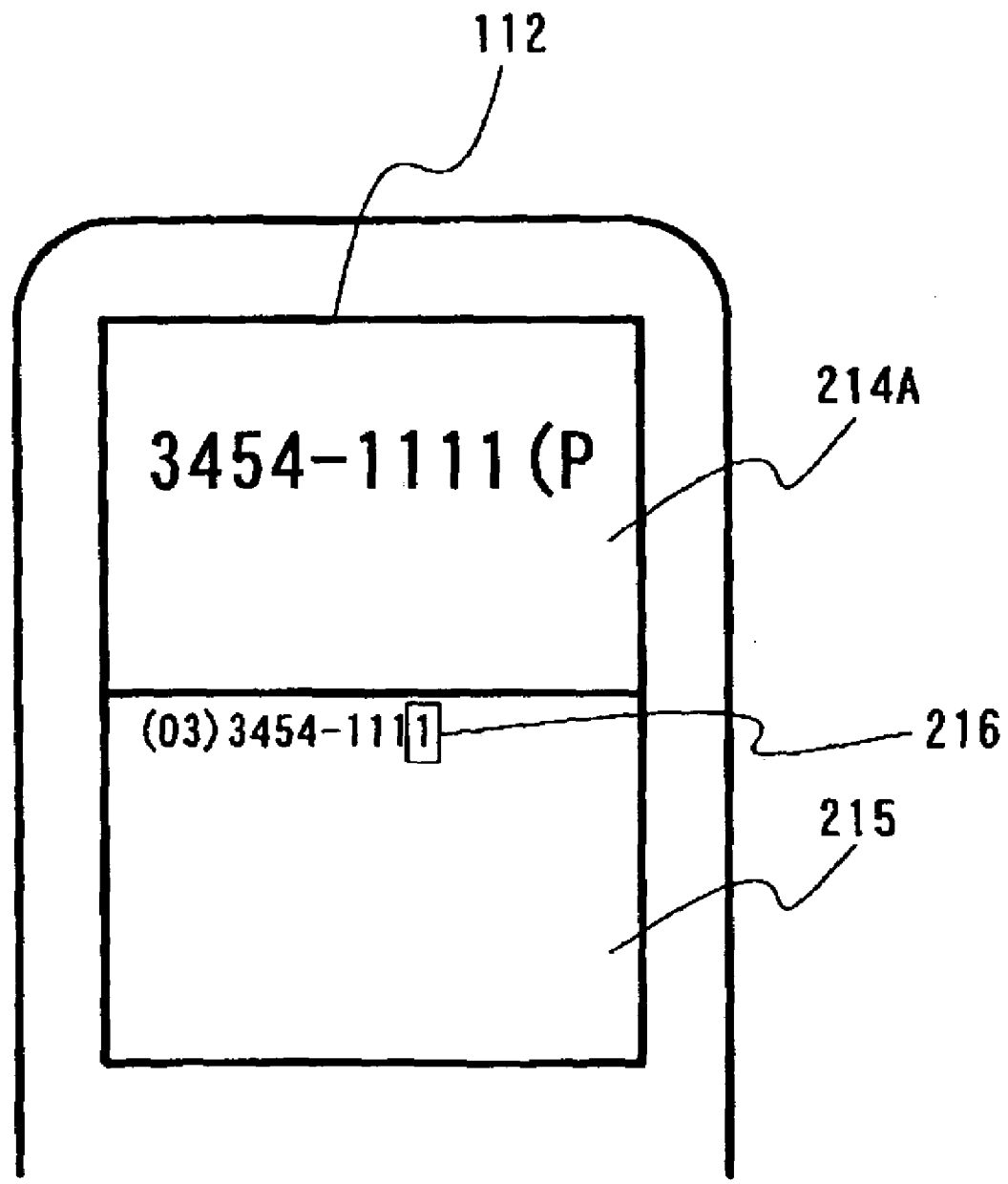
FIG. 49 is a diagram for use in explaining how an unnecessary character entered in the right part of the input result of the telephone number is deleted in the seventh concrete example of the present invention.

Here, the user is allowed to delete the additional "(P" by pressing the deletion key twice as shown in FIG. 49. Since simple operation thus enables deletion of erroneously entered characters, a part of a sentence complicatedly printed can be input with ease.

The functions of the character extraction device 51, the character recognition device 52, and the recognition data synthesizing device 53 in the data processing device 50 and the functions of the character correcting device 25 and the image difference detection device 90 of the character input device according to each of the above-described embodiments, and the other functions can be realized in software by loading a control program having the respective functions into a memory of a computer processing device. A character input program 300 is stored in a magnetic disc, a semiconductor memory, or other recording medium. Then, loading the program from the recording medium into the computer processing device to control operation of the computer processing device realizes each of the above-described functions.

Although the present invention has been described with respect to the preferred embodiments and concrete examples in the foregoing, the present invention is not necessarily limited to the above-described embodiments and examples and can be embodied in various forms with a scope of its technical idea.

While in the above-described embodiments and concrete examples, the description has been made of a case where as a photographing device, a camera is used in particular, the present invention includes other case where a optical scanner (handy scanner or the like) is used as a photographing device. The present invention attains the effect not only in a case where a character string is input by photographing a document using such a photographing device as a camera having low resolution but also in a case where a character string is input by such a photographing device as a optical scanner having high resolution.

As described in the foregoing, according to the character input device and the character input method of the present invention, the following effects can be attained.

First, at the time of inputting characters by using a camera, even when a high-quality photographed image can not be obtained due to unsatisfied resolution of the camera, distortion of a lens or the like, accurate input based on character recognition can be realized. In addition, such additional image processing as compensating a photographed image for character recognition can be eliminated.

The reason is that recognition reliability is stored for each character to replace unreliable result with more reliable result every time photographing is performed.

Second is that at the time of inputting characters by using a camera, erroneous input caused by erroneous recognition can be corrected with ease.

The reason is that re-photographing of an erroneously input character is expected to replace by a correct character, and even if the re-photographing fails to correct the error, a correct character can be input with less key operation.

Third is that at the time of inputting characters by using a camera, even when a photographed image includes no overlap portion in divisional photographing, the image can be used afterwards without wasting the same.

The reason is that the recognition result of the image is held to again try to synthesize after another input is made.

Fourth is elimination of a series of pressing a shutter at the time of divisionally photographing a document. Camera-shake caused by tripping the shutter can be also prevented.

The reason is that checking a frame difference of video input from a camera enables automatic photographing at the timing when the camera movement remains stationary for a fixed time period.

Fifth is enabling input of a character string as a part of a document with ease.

The reason is that it is only necessary to photograph a target character string located at a mark on the screen, and in case of a long character string using divisional photographing, it is photographed at the first time located at a mark and in the following photographing only a line image which can be synthesized with inputs obtained so far is extracted to perform automatic synthesis without precisely locating.

Sixth is enabling a character string having a line feed halfway to be input with ease.

The reason is that successively photographing a character string having a line feed in the same manner as that of divisional photographing of a character string leads to displaying of a message inquiring whether connection is to be made or not on a screen to enable just key operation to connect the parts before and after the line feed of the character string.

Seventh is that even when unnecessary character strings are printed adjacently before or after a character string to be input, correction can be made with ease.

The reason is that when photographing is made including unnecessary character strings, since a cursor will be automatically moved to the beginning of a line at the initial photographing and moved to the end at the following photographing, unnecessary character(s) before and after a character string can be deleted with ease simply by pressing a deletion key one or more times.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A character input device for inputting a character by extracting and recognizing a character from an image of a document photographed by a photographing device, comprising:

character extraction means for extracting an image of a character portion from the image photographed by said photographing device;

character recognition means for recognizing a character from the image of said character portion and for making into character recognition data a character recognition result and reliability indicative of sureness of recognition;

recognition data synthesizing means for detecting and connecting overlap portions in said character recognition data obtained from a plurality of images of a same document, as well as selecting character recognition data whose said reliability is high with respect to the overlap portions to synthesize a plurality of said character recognition data into one said character recognition data; and recognition data storage means for storing said synthesized character recognition data, wherein said recognition data synthesizing means detects, with respect to said character recognition data obtained from the plurality of images of the same document, an overlap portion between said character recognition data obtained from a latest image and said character recognition data obtained from a former image which is stored in said recognition data storage means, and wherein when said reliability of said character recognition data obtained from said latest image is higher, rewrites said character recognition data obtained from the former image in said recognition data storage means.

2. The character input device as set forth in claim 1, wherein said reliability is determined based on at least information about:

a degree of coincidence between a dictionary to be referred to in character recognition and a character extracted from said photographed image; and distortion of said photographed image.

3. The character input device as set forth in claim 1, further comprising:

character correction means for reading, from said recognition data storage means, at least one other recognition candidate for a character designated from among characters stored as said character recognition data, for presenting the read at least one other recognition candidate, and for replacing said character recognition data of said designated character with character recognition data of a character selected from said at least one other recognition candidate to correct said character recognition data.

4. The character input device as set forth in claim 3, wherein said character correction means selects, from among said character recognition data displayed on a display means, character recognition data of a character located in a vicinity of a center of a photographed image as a character to be corrected.

5. The character input device as set forth in claim 1, wherein said recognition data synthesizing means detects, with respect to said character recognition data obtained from the plurality of images of the same document, an overlap portion between said character recognition data obtained from a latest image and said character recognition data obtained from a former image which is stored in said recognition data storage means and, when none of said overlap portion is detected, stores said character recognition data obtained from said latest image as pending data and detects an overlap portion of character recognition data obtained from a subsequently input image with said pending data.

6. The character input device set forth in claim 1, further comprising:

image temporary storage means for temporarily storing an image photographed by said photographing device; and image difference detecting means for detecting a difference between an image stored in said image temporary storage means and an image input from said photographing device and, when said difference detected is not more than a predetermined threshold value, for determining that said photographing device is at a stationary state to send a photographing instruction to said photographing device.

7. The character input device as set forth in claim 6, wherein said image difference detecting means determines that said photographing device is at the stationary state when a state where said difference is not more than the predetermined threshold value continues for a predetermined period of time.

8. A character input method of inputting a character by extracting and recognizing a character from an image of a document photographed by a photographing device, comprising:

adding reliability indicative of sureness of recognition to a recognition result of said character;

comparing character recognition results of images obtained by repeated photographing a whole or a part of said document;

selecting a character recognition result whose said reliability is the highest;

detecting and connecting overlap portions in character recognition data obtained from a plurality of images of a same document;

selecting said character recognition data whose said reliability is high with respect to the overlap portions to synthesize a plurality of said character recognition data into one said character recognition data; and in said recognition data synthesis, with respect to said character recognition data obtained from the plurality of images of the same document, detecting an overlap portion between said character recognition data obtained from a latest image and said character recognition data obtained from a former image and, when said reliability of said character recognition data obtained from said latest image is higher, rewriting said character recognition data obtained from the former image.

9. The character input method as set forth in claim 8, wherein said reliability is determined based on at least information about:

a degree of coincidence between a dictionary to be referred to in character recognition and a character extracted from said photographed image; and distortion of said photographed image.

10. The character input method as set forth in claim 8, further comprising:

designating a character stored as said character recognition data to present other candidates for the designated character and replacing said character recognition data of said designated character with character recognition data of a character selected from among said candidates to correct said character recognition data.

11. The character input method as set forth in claim 10, further comprising:

moving a cursor to said character recognition data of a character located in a vicinity of a center of a photographed image among said character recognition data displayed to indicate it is highly probable that the character will be corrected.

12. The character input method as set forth in claim 8, further comprising:

detecting, in said recognition data synthesis, with respect to said character recognition data obtained from the plurality of images of the same document, an overlap portion between said character recognition data obtained from a latest image and said character recognition data obtained from a former image and, when detecting none of said overlap portion, storing said character recognition data obtained from said latest image as pending data and detecting an overlap portion of said character recognition data obtained from a subsequently input image with said pending data.

13. The character input method as set forth in claim 8, further comprising:

detecting an amount of movement of said photographing device from a difference between successively input images and discriminating a stationary state of said photographing device based on said amount of movement to automatically execute image photographing.

14. The character input method as set forth in claim 8, further comprising:

temporarily storing an image photographed by said photographing device;

detecting a difference between said temporarily stored image and an image input from said photographing device; and when said difference detected is not more than a predetermined threshold value, determining that said photographing device is at a stationary state to send a photographing instruction to said photographing device.

15. The character input method as set forth in claim 14, further comprising:

determining that said photographing device is at the stationary state when a state where said difference is not more than the predetermined threshold value continues for a predetermined period of time.

16. A computer-readable medium encoded with a character input program for inputting a character by extracting and recognizing a character from an image of a document photographed by a photographing device, wherein the character input program comprises the functions of:

adding reliability indicative of sureness of recognition to a recognition result of said character;

comparing character recognition results of images obtained by repeatedly photographing a whole or a part of said document to select a character recognition result whose said reliability is the highest, detecting and connecting overlap portions in character recognition data obtained from a plurality of images of a same document;

selecting said character recognition data whose said reliability is high with respect to the overlap portions to synthesize a plurality of said character recognition data into one said character recognition data;

detecting, with respect to said character recognition data obtained from a plurality of images of a same document, an overlap portion between character recognition data obtained from a latest image and character recognition data obtained from a former image; and when said reliability of said character recognition data obtained from said latest image is higher, rewriting said character recognition data obtained from the former image.

17. The computer-readable medium as set forth in claim 16, wherein said reliability is determined based on at least information about:

a degree of coincidence between a dictionary to be referred to in character recognition and the character extracted from said photographed image; and distortion of said photographed image.

18. The computer-readable medium as set forth in claim 16, further comprising the character correction function of:

designating a character stored as said character recognition data to present other candidates fur the designated character; and replacing said character recognition data of said designated character with said character recognition data of a character selected from among said candidates to correct said character recognition data.

19. The computer-readable medium as set forth in claim 18, wherein the character correction function comprises:

moving a cursor to said character recognition data of a character located in a vicinity of a center of a photographed image among said character recognition data displayed to indicate it is highly probable that the character will be corrected.

20. The computer-readable medium as set forth in claim 16, wherein said recognition data synthesis function comprises:

detecting, with respect to said character recognition data obtained from the plurality of images of the same document, an overlap portion between said character recognition data obtained from a latest image and said character recognition data obtained from a former image; and when detecting none of said overlap portion, storing said character recognition data obtained from said latest image as pending data and detecting an overlap portion of said character recognition data obtained from a subsequently input image with said pending data.

21. The computer-readable medium as set forth in claim 16, further comprising:

detecting an amount of movement of said photographing device from a difference between successively input images; and discriminating a stationary state of said photographing device based on said amount of movement to automatically execute image photographing.

22. The computer-readable medium as set forth in claim 16, further comprising:

temporarily storing an image photographed by said photographing device;

detecting a difference between said temporarily stored image and an image input from said photographing device; and when said difference detected is not more than a predetermined threshold value, determining that said photographing device is at a stationary state to send a photographing instruction to said photographing device.

23. The character input device as set forth in claim 1, further comprising:

mark drawing means for drawing a mark indicative of a position of a specific character string designated in an image photographed by said photographing device; and line extraction means for dividing said photographed image into line images on a line basis and sequentially sending the divided line images to said character extraction means starting with a line image closest to said mark.

24. The character input device as set forth in claim 1, wherein said recognition data synthesizing means comprises forced connection means for, when no overlap portion is detected between said character recognition data obtained from a latest image and said character recognition data obtained from a former image which is stored in said recognition data storage means, forcedly connecting said character recognition data according to an instruction from a user.

25. The character input device as set forth in claim 23, further comprising:

position control means for determining whether data is said character recognition data from an initially photographed image based on said character recognition data stored in said recognition data storage means and for indicating a position of a beginning of a character string to be recognized when the character recognition data is of the initially photographed image and otherwise indicating a position of an end of the character string to be recognized; and deletion means for deleting a character of said character recognition data based on an indicated position at the beginning or the end of the character string to be recognized.

* * * * *